United States Patent
Sasai et al.

(10) Patent No.: US 9,749,623 B2
(45) Date of Patent: Aug. 29, 2017

(54) MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

(71) Applicant: Panasonic Intellectual Property Corporation of America, Torrance, CA (US)

(72) Inventors: Hisao Sasai, Osaka (JP); Kengo Terada, Osaka (JP); Youji Shibahara, Osaka (JP); Kyoko Tanikawa, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 405 days.

(21) Appl. No.: 13/898,722

(22) Filed: May 21, 2013

(65) Prior Publication Data
US 2013/0315297 A1    Nov. 28, 2013

Related U.S. Application Data

(60) Provisional application No. 61/651,653, filed on May 25, 2012.

(51) Int. Cl.
*H04N 19/13* (2014.01)
*H04N 19/91* (2014.01)
(Continued)

(52) U.S. Cl.
CPC ..... *H04N 19/00127* (2013.01); *H04N 19/463* (2014.11); *H04N 19/70* (2014.11); *H04N 19/91* (2014.11); *H04N 19/82* (2014.11)

(58) Field of Classification Search
None
See application file for complete search history.

(56) References Cited

U.S. PATENT DOCUMENTS

| 6,900,748 B2 | 5/2005 | Marpe et al. |
| 7,088,271 B2 | 8/2006 | Marpe et al. |
| (Continued) | | |

FOREIGN PATENT DOCUMENTS

| CN | 1949873 | 4/2007 |
| CN | 101771879 | 7/2010 |
| (Continued) | | |

OTHER PUBLICATIONS

International Search Report issued Aug. 20, 2013 in International (PCT) Application No. PCT/JP2013/003158.
(Continued)

*Primary Examiner* — Kevin McInnish
(74) *Attorney, Agent, or Firm* — Wenderoth, Lind & Ponack, L.L.P.

(57) ABSTRACT

A moving picture coding method includes: performing context adaptive binary arithmetic coding in which a variable probability value is used, on first information among multiple types of sample adaptive offset (SAO) information used for SAO that is a process of assigning an offset value to a pixel value of a pixel included in an image generated by coding the input image; and continuously performing bypass arithmetic coding in which a fixed probability value is used, on second information and third information among the multiple types of the SAO information, wherein the coded second and third information are placed after the coded first information in the bit stream.

13 Claims, 35 Drawing Sheets

| sao_offset_cabac( rx, ry, cIdx ) { | Descriptor |
|---|---|
|   sao_type_idx[ cIdx ][ rx ][ ry ] | ae(v) |
|   if( sao_type_idx[cIdx ][ rx ][ ry ] != 0 ) { | |
|     for( i = 0; i < 4; i++ ) | |
|       sao_offset_prefix [ cIdx ][ rx ][ ry ][ i ] | ae(v) |
|     for( i = 0; i < 4; i++ ) | |
|       sao_offset_suffix [ cIdx ][ rx ][ ry ][ i ] | ae(v) |
|     if( sao_type_idx[cIdx ][ rx ][ ry ] == 5 ) { | |
|       for( i = 0; i < 4; i++ ) { | |
|         if( sao_offset[cIdx ][ rx ][ ry ] != 0 ) | |
|           sao_offset_sign[ cIdx ][ rx ][ ry ][ i ] | ae(v) |
|       } | |
|       sao_band_position[ cIdx ][ rx ][ ry ] | ae(v) |
|     } | |
|   } | |
| } | |

(51) Int. Cl.
*H04N 19/132* (2014.01)
*H04N 19/70* (2014.01)
*H04N 19/463* (2014.01)
*H04N 19/82* (2014.01)

(56) References Cited

U.S. PATENT DOCUMENTS

| | | | |
|---|---|---|---|
| 7,535,387 | B1 | 5/2009 | Delva |
| 7,860,160 | B2 | 12/2010 | Shimazaki et al. |
| 8,581,753 | B2 | 11/2013 | Kim et al. |
| 8,781,001 | B2 | 7/2014 | Sasai et al. |
| 8,837,582 | B2 | 9/2014 | He et al. |
| 8,907,823 | B2 | 12/2014 | Marpe et al. |
| 8,947,273 | B2 | 2/2015 | Bartnik et al. |
| 9,042,440 | B2 | 5/2015 | Sole Rojals et al. |
| 2001/0017944 | A1 | 8/2001 | Kalevo et al. |
| 2005/0012648 | A1* | 1/2005 | Marpe ............ H03M 7/4006 341/107 |
| 2005/0038837 | A1 | 2/2005 | Marpe et al. |
| 2006/0028359 | A1 | 2/2006 | Kim et al. |
| 2006/0156204 | A1 | 7/2006 | Lee et al. |
| 2006/0280371 | A1 | 12/2006 | Shimazaki et al. |
| 2006/0285757 | A1 | 12/2006 | Abe et al. |
| 2007/0040711 | A1 | 2/2007 | Ziauddin |
| 2007/0080832 | A1 | 4/2007 | Yang et al. |
| 2007/0171985 | A1 | 7/2007 | Kim et al. |
| 2008/0063084 | A1 | 3/2008 | Xue et al. |
| 2009/0089549 | A1 | 4/2009 | Liu et al. |
| 2009/0195681 | A1 | 8/2009 | Compton et al. |
| 2011/0228858 | A1 | 9/2011 | Budagavi et al. |
| 2011/0243226 | A1 | 10/2011 | Choi et al. |
| 2011/0310958 | A1 | 12/2011 | Sachdeva et al. |
| 2012/0014454 | A1 | 1/2012 | Budagavi et al. |
| 2012/0027083 | A1 | 2/2012 | Narroschke et al. |
| 2012/0057637 | A1 | 3/2012 | Flachs et al. |
| 2012/0069906 | A1 | 3/2012 | Sato |
| 2012/0127002 | A1 | 5/2012 | Shibahara et al. |
| 2012/0170647 | A1 | 7/2012 | He et al. |
| 2012/0177107 | A1 | 7/2012 | Fu et al. |
| 2012/0294353 | A1* | 11/2012 | Fu et al. ............ 375/240.02 |
| 2012/0300839 | A1 | 11/2012 | Sze et al. |
| 2012/0320971 | A1 | 12/2012 | Xu |
| 2012/0328001 | A1 | 12/2012 | He et al. |
| 2013/0003824 | A1 | 1/2013 | Guo et al. |
| 2013/0003838 | A1 | 1/2013 | Gao et al. |
| 2013/0003840 | A1 | 1/2013 | Gao et al. |
| 2013/0003849 | A1 | 1/2013 | Chien et al. |
| 2013/0016777 | A1 | 1/2013 | Gao et al. |
| 2013/0027230 | A1 | 1/2013 | Marpe et al. |
| 2013/0064294 | A1 | 3/2013 | Sole Rojals et al. |
| 2013/0083856 | A1 | 4/2013 | Sole Rojals et al. |
| 2013/0107951 | A1 | 5/2013 | Sole Rojals et al. |
| 2013/0114668 | A1* | 5/2013 | Misra ............ H04N 19/13 375/240.02 |
| 2013/0114674 | A1 | 5/2013 | Chong et al. |
| 2013/0114691 | A1 | 5/2013 | Guo et al. |
| 2013/0114693 | A1 | 5/2013 | Gao et al. |
| 2013/0114716 | A1 | 5/2013 | Gao et al. |
| 2013/0114738 | A1 | 5/2013 | Chien et al. |
| 2013/0128966 | A1 | 5/2013 | Gao et al. |
| 2013/0129238 | A1 | 5/2013 | Sasai et al. |
| 2013/0136375 | A1 | 5/2013 | Sasai et al. |
| 2013/0177069 | A1 | 7/2013 | Sze et al. |
| 2013/0187796 | A1* | 7/2013 | Kim ............ H03M 7/4018 341/51 |
| 2013/0188734 | A1 | 7/2013 | Kim et al. |
| 2013/0223542 | A1 | 8/2013 | Kim et al. |
| 2013/0272389 | A1 | 10/2013 | Sze et al. |
| 2013/0294501 | A1* | 11/2013 | Sze et al. ............ 375/240.02 |
| 2013/0315297 | A1 | 11/2013 | Sasai et al. |
| 2013/0336382 | A1 | 12/2013 | Sole Rojals et al. |
| 2014/0140400 | A1 | 5/2014 | George et al. |
| 2014/0210652 | A1 | 7/2014 | Bartnik et al. |
| 2014/0307778 | A1 | 10/2014 | He et al. |
| 2014/0334559 | A1 | 11/2014 | Kim et al. |
| 2015/0098513 | A1 | 4/2015 | Fu et al. |
| 2015/0172666 | A1* | 6/2015 | Fu et al. ............ 375/240.02 |

FOREIGN PATENT DOCUMENTS

| | | |
|---|---|---|
| CN | 102186087 | 9/2011 |
| CN | 102231830 | 11/2011 |
| JP | 2007-142637 | 6/2007 |
| JP | 2012-23613 | 2/2012 |
| RU | 2358410 | 6/2009 |
| RU | 2370816 | 10/2009 |
| RU | 2439682 | 1/2012 |
| TW | 200939760 | 9/2009 |
| TW | 201130315 | 9/2011 |
| TW | 201134225 | 10/2011 |
| WO | 2008/002897 | 1/2008 |

OTHER PUBLICATIONS

International Search Report issued Jul. 9, 2013 in International (PCT) Application No. PCT/JP2013/002396.

International Search Report issued Aug. 6, 2013 in International (PCT) Application No. PCT/JP2013/003113.

International Search Report issued Aug. 20, 2013 in International (PCT) Application No. PCT/JP2013/003141.

Written Opinion of the International Searching Authority issued Jul. 9, 2013 in International (PCT) Application No. PCT/JP2013/002396 (with English translation).

Chih-Ming Fu et al., "Non-CE1: Bug-fix of offset coding in SAO interleaving mode", Joint Collaborative Team on Video Coding (JCT-VC) of ITU-T SG16 WP3 and ISO/IEC JTC1/SC29/WG11 JCTVC-I0168, 9th Meeting: Geneva, CH, Apr. 27-May 7, 2012.

Yu-Wen Huang, "BoG report on intergrated text of SAO adoptions on top of JCTVC-I0030", Joint Collaborative Team on Video Coding (JCT-VC) of ITU-T SG16 WP3 and ISO/IEC JTC1/SC29/WG11, JCTVC-I0602, 9th Meeting: Geneva, CH, Apr. 27-May 7, 2012.

Yu-Wen Huang, "BoG report on SAO", Joint Collaborative Team on Video Coding (JCT-VC) of ITU-T SG16 WP3 and ISO/IEC JTC1/SC29/WG11 JCTVC-I0576, 9th Meeting: Geneva, CH, Apr. 27-May 7, 2012.

Vivienne Sze, "Reduction in context coded bins for ref_idx and cu_qo_delta", Joint Collaborative Team on Video Coding (JCT-VC) of ITU-T SG16 WP3 and ISO/IEC JTC1/SC29/WG11, JCTVC-I0204, 9th Meeting: Geneva, CH, Apr. 27-May 7, 2012.

Vadim Seregin, "Binarisation modification for last position coding", Joint Collaborative Team on Video Coding (JCT-VC) of ITU-T SG 16 WP3 and ISO/EC JCT1/SC29/WG11, JCTVC-F375, 6th Meeting: Torino, IT, Jul. 14-22, 2011.

Hisao Sasai, "Modified MVD coding for CABAC", Joint Collaborative Team on Video Coding (JCT-VC) of ITU-T SG 16 WP3 and ISO/IEC JTC1/SC29/WG11 JCTVC-F423, 6th Meeting: Torino, IT, Jul. 14-22, 2011.

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_dl, Ver.2, 9th Meeting: Geneva, CH, Apr. 27-May 7, 2012.

"Advanced video coding for generic audiovisual services", ITU-T Recommendation H. 264, Mar. 2010.

Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012.

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d2, Ver.3, 9th Meeting: Geneva, CH, Apr. 27-May 7, 2012.

Vadim Seregin et al., "Bypass bins for reference index and delta QP coding", Joint Collaborative Team on Video Coding (JCT-VC) of

(56) References Cited

OTHER PUBLICATIONS

ITU-T SG 16 WP 3 and ISO/IEC JTC 1/SC 29/WG 11, JCTVC-I0594, 9th Meeting: Geneva, CH, Apr. 27-May 7, 2012.
Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, 8th Meeting: San Jose, CA, USA, Feb. 1-10, 2012.
Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012, Version 3.
E. Maani et al., "SAO Type Coding Simplification", Joint Collaborative Team on Video Coding (JCT-VC) of ITU-T SG16 WP3 and ISO/IEC JTC1/SC29/WG11, JCTVC-I0246, 9th Meeting: Geneva, CH, Apr. 27-May 7, 2012, XP030052835.
Tom Matsunobu et al., "AHG5/AHG6: Bypass coding for SAO syntax elements", Joint Collaborative Team on Video Coding (JCT-VC) of ITU-T SG16 WP3 and ISO/IEC JTC1/SC29/WG11, JCTVC-J0148, $10^{th}$ Meeting: Stockholm, SE, Jul. 11-20, 2012, XP030112510.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066, 9th Meeting: Geneva, CH, Apr. 27-May 7, 2012, XP030111829.
Guillaume Laroche et al., "NonCE1: On SAO parameter reduction for Chroma", Joint Collaborative Team on Video Coding (JCT-VC) of ITU-T SG16 WP3 and ISO/IEC JTC1/SC29/WG11, JCTVC-I0183, $9^{th}$ Meeting: Geneva, CH, Apr. 27-May 7, 2012, XP030111946.
Extended European Search Report issued Jul. 27, 2015 in European Application No. 13794340.3.
Detlev Marpe et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073.
Woo-Shik Kim et al., "AhG6: SAO Offset Bypass Coding", Joint Collaborative Team on Video Coding (JCT-VC) of ITU-T SG16 WP3 and ISO/IEC JTC1/SC29/WG11, JCTVC-J0141, 10th Meeting: Stockholm, SE, Jul. 11-20, 2012, XP030112503.
Extended European Search Report issued Mar. 27, 2015 in European Application No. 13800607.7.
Extended European Search Report issued Mar. 27, 2015 in European Application No. 13793080.6.
E. Maani et al., "SAO Type Coding Simplification", Joint Collaborative Team on Video Coding (JCT-VC) of ITU-T SG16 WP3 and ISO/IEC JTC1/SC29/WG11, JCTVC-I0246, $9^{th}$ Meeting: Geneva, CH, Apr. 27-May 7, 2012, XP030052835.
Toru Matsunobu et al., "AHG5/AHG6: Bypass coding for SAO syntax elements", Joint Collaborative Team on Video Coding (JCT-VC) of ITU-T SG16 WP3 and ISO/IEC JTC1/SC29/WG11, JCTVC-J0148, $10^{th}$ Meeting: Stockholm, SE, Jul. 11-20, 2012, XP030112510.
C. Rosewarne et al., "AHG5: On SAO syntax elements coding", Joint Collaborative Team on Video Coding of ITU-T SG16 WP3 and ISO/IEC JTC1/SC29/WG11, JCTVC-J0178, $10^{th}$ Meeting: Stockholm, SE, Jul. 11-20, 2012, XP030112540.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066, $9^{th}$ Meeting: Geneva, CH, Apr. 27-May 7, 2012, XP030111829.
Joel Sole et al., "AhG6: Bypass bins grouping in SAO", Joint Collaborative Team on Video Coding (JCT-VC) of ITU-T SG16 WP3 and ISO/IEC JTC1/SC29/WG11, JCTVC-J0054, $10^{th}$ Meeting: Stockholm, SE, Jul. 11-20, 2012, XP030112416.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066_r2, $9^{th}$ Meeting: Geneva, CH, Apr. 27-May 7, 2012, XP030052650.
Guillaume Laroche et al., "Non-CE1: On SAO parameters reduction for Chroma", Joint Collaborative Team on Video Coding (JCT-VC) of ITU-T SG16 WP3 and ISO/IEC JTC1/SC29/WG11, JCTVC-I0183, $9^{th}$ Meeting: Geneva, CH, Apr. 27-May 7, 2012, XP030111946.
Examination Report issued on Jan. 17, 2017 in Singapore Application No. 201400081-4.
Vivienne Sze et al., "Reduction in context coded bins for ref_idx and cu_qp_delta", Joint Collaborative Team on Video Coding (JCT-VC) of ITU-T SG 16 WP 3 and ISO/IEC JTC 1/SC 29/WG 11, JCTVC-I0204, 9th Meeting: Geneva, CH, Apr. 27-May 7, 2012, pp. 1-5.
Office Action issued Oct. 27, 2016 in U.S. Appl. No. 13/897,975.
Office Action issued Nov. 14, 2016 in U.S. Appl. No. 14/509,199.
Office Action dated May 18, 2017 in U.S. Appl. No. 13/897,975.
Office Action dated May 25, 2017 in U.S. Appl. No. 14/509,199.
Office Action dated Jun. 29, 2017 in U.S. Appl. No. 15/170,068.

* cited by examiner

FIG. 1A

| sao_type_idx[ cIdx ][ rx ][ ry ] | SAO type (informative) |
|---|---|
| 0 | Not applied |
| 1 | 1D 0-degree edge offset |
| 2 | 1D 90-degree edge offset |
| 3 | 1D 135-degree edge offset |
| 4 | 1D 45-degree edge offset |
| 5 | Band offset |

FIG. 1B sao_band_position[ cIdx ][ rx ][ ry ] : xxxxx / bypass coding

FIG. 1C sao_offset[ cIdx ][ rx ][ ry ][ i ] : XXX / context coding

FIG. 1D sao_offset_sign[ cIdx ][ rx ][ ry ][ i ] : X / bypass coding

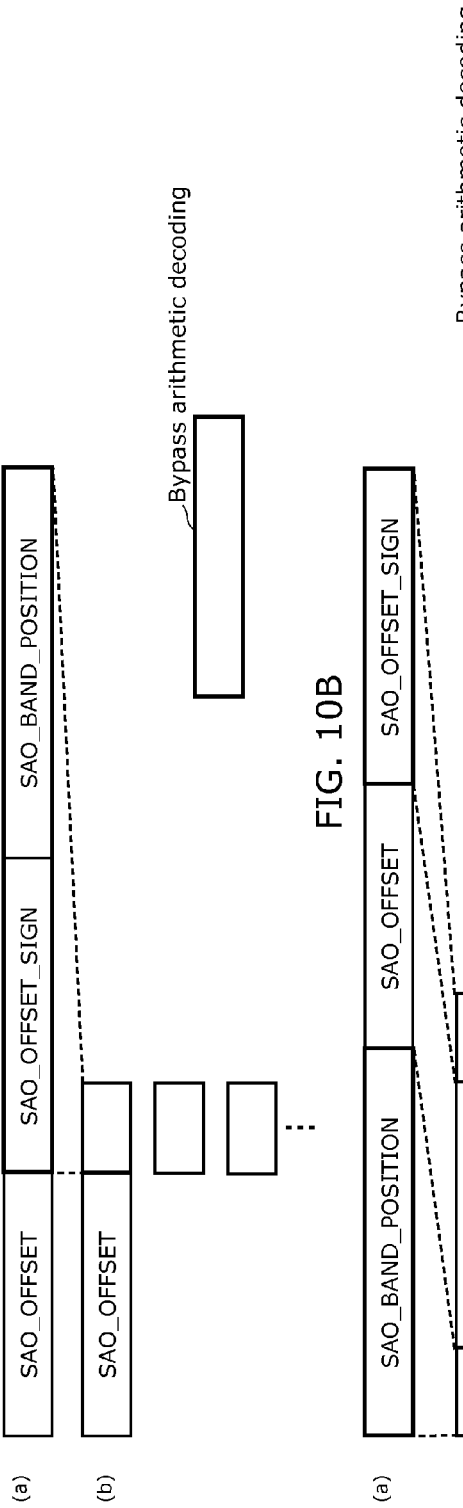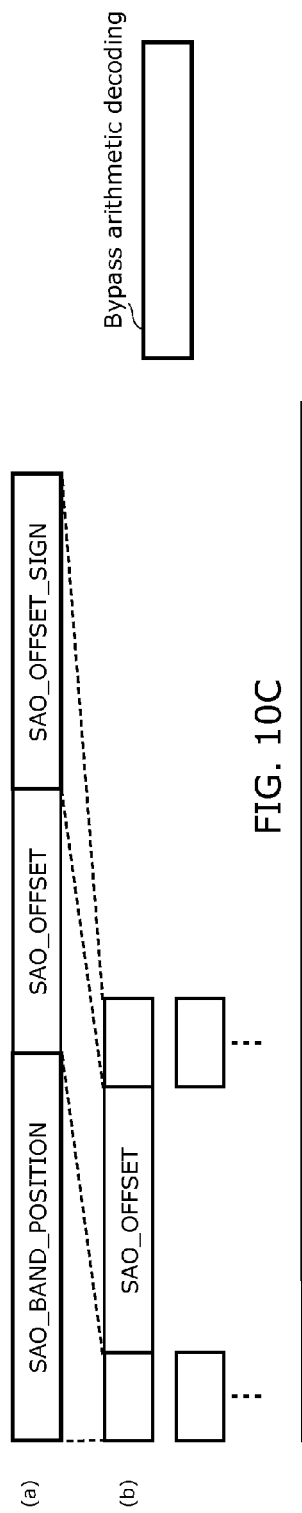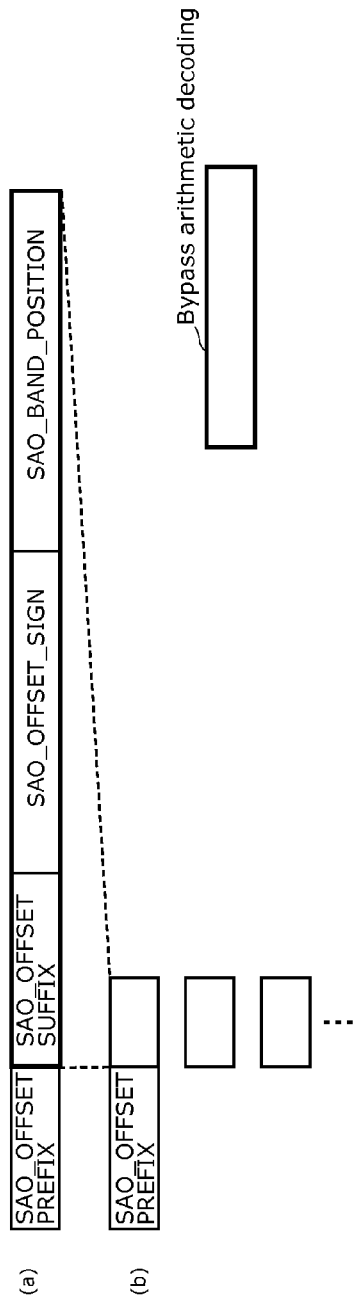

FIG. 13A

| sao_offset_cabac( rx, ry, cIdx ) { | Descriptor |
|---|---|
|   sao_type_idx[ cIdx ][ rx ][ ry ] | ae(v) |
|   if( sao_type_idx[ cIdx ][ rx ][ ry ] == 5 ) | |
|     sao_band_position[ cIdx ][ rx ][ ry ] | ae(v) |
|   if( sao_type_idx[ cIdx ][ rx ][ ry ] != 0 ) { | |
|     for( i = 0; i < 4; i++ ) | |
|       sao_offset[ cIdx ][ rx ][ ry ][ i ] | ae(v) |
|   } | |
|   if( sao_type_idx[ cIdx ][ rx ][ ry ] == 5 ) { | |
|     for( i = 0; i < 4; i++ ) { | |
|       if( sao_offset[ cIdx ][ rx ][ ry ] != 0 ) | |
|         sao_offset_sign[ cIdx ][ rx ][ ry ][ i ] | ae(v) |
|     } | |
|   } | |
| } | |

FIG. 13B

| sao_offset_cabac( rx, ry, cIdx ) { | Descriptor |
|---|---|
|   sao_type_idx[ cIdx ][ rx ][ ry ] | ae(v) |
|   if( sao_type_idx[ cIdx ][ rx ][ ry ] != 0 ) { | |
|     for( i = 0; i < 4; i++ ) | |
|       sao_offset[ cIdx ][ rx ][ ry ][ i ] | ae(v) |
|     if( sao_type_idx[ cIdx ][ rx ][ ry ] == 5 ) { | |
|       for( i = 0; i < 4; i++ ) { | |
|         if( sao_offset[ cIdx ][ rx ][ ry ] != 0 ) | |
|           sao_offset_sign[ cIdx ][ rx ][ ry ][ i ] | ae(v) |
|       } | |
|       sao_band_position [ cIdx ][ rx ][ ry ] | ae(v) |
|     } | |
|   } | |
| } | |

FIG. 14

| sao_offset_cabac( rx, ry, cIdx ) { | Descriptor |
|---|---|
|   sao_type_idx[ cIdx ][ rx ][ ry ] | ae(v) |
|   if( sao_type_idx[cIdx ][ rx ][ ry ] != 0 ) { | |
|     for( i = 0; i < 4; i++ ) | |
|       sao_offset_prefix [ cIdx ][ rx ][ ry ][ i ] | ae(v) |
|     for( i = 0; i < 4; i++ ) | |
|       sao_offset_suffix [ cIdx ][ rx ][ ry ][ i ] | ae(v) |
|     if( sao_type_idx[cIdx ][ rx ][ ry ] == 5 ) { | |
|       for( i = 0; i < 4; i++ ) { | |
|         if( sao_offset[cIdx ][ rx ][ ry ] != 0 ) | |
|           sao_offset_sign[ cIdx ][ rx ][ ry ][ i ] | ae(v) |
|       } | |
|       sao_band_position[ cIdx ][ rx ][ ry ] | ae(v) |
|     } | |
|   } | |
| } | |

FIG. 22

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

CROSS REFERENCE TO RELATED APPLICATION

The present application claims the benefit of U.S. Provisional Patent Application No. 61/651,653 filed on May 25, 2012. The entire disclosure of the above-identified application, including the specification, drawings and claims is incorporated herein by reference in its entirety.

FIELD

The present disclosure relates to a moving picture coding method and a moving picture decoding method.

BACKGROUND

The High Efficiency Video Coding (HEVC) standard, a next-generation image coding standard, has been examined in various ways to increase its coding efficiency (Non Patent Literature (NPL) 1). In addition, the International Telecommunication Union Telecommunication Standardization sector (ITU-T) standard typified by H.26x, and the ISO/IEC standard typified by MPEG-x exist conventionally. The latest and most advanced image coding standard has been examined as a standard next to a standard currently typified by H.264/AVC or MPEG-4 AVC (see Non Patent Literature (NPL) 2).

In the HEVC standard, coding degradation reduction processing referred to as sample adaptive offset (SAO) has been examined to further reduce coding degradation (a difference between an original signal before coding and a coded and decoded signal). The SAO is offset processing in which an offset value is added for each of predetermined regions, categories, or types, to reduce the coding degradation, and is performed on a provisionally decoded image (reconstructed image) (see Non Patent Literature (NPL) 3).

CITATION LIST

Non Patent Literature

[NPL 1] Joint Collaborative Team on Video Coding (JCT-VC) of ITU-T SG16 WP3 and ISO/IEC JTC1/SC29/WG11 9th Meeting: Geneva, CH, 27 Apr.-7 May 2012, JCTVC-I1003_d1, "High efficiency video coding (HEVC) text specification draft 7"
[NPL 2] ITU-T Recommendation H.264 "Advanced video coding for generic audiovisual services", March, 2010
[NPL 3] Joint Collaborative Team on Video Coding (JCT-VC) of ITU-T SG16 WP3 and ISO/IEC JTC1/SC29/WG11 9th Meeting: Geneva, CH, 27 Apr.-7 May 2012, JCTVC-I0602, "BoG report on integrated text of SAO adoptions on top of JCTVC-I0030"

SUMMARY

Technical Problem

However, a moving picture coding method and a moving picture decoding method using the SAO of NPL 3 cannot make processing efficient.

In view of this, one non-limiting and exemplary embodiment provides a moving picture coding method and a moving picture decoding method that can make processing efficient.

Solution to Problem

A moving picture coding method according to an aspect of the present disclosure is a moving picture coding method for coding an input image to generate a bit stream, the method including: performing context adaptive binary arithmetic coding in which a variable probability value is used, on first information among multiple types of sample adaptive offset (SAO) information used for SAO that is a process of assigning an offset value to a pixel value of a pixel included in an image generated by coding the input image; and continuously performing bypass arithmetic coding in which a fixed probability value is used, on second information and third information among the multiple types of the SAO information, wherein the coded second and third information are placed after the coded first information in the bit stream.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A moving picture coding method and a moving picture decoding method in the present disclosure can make processing efficient.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1A is a table showing information used for offset processing referred to as SAO.
FIG. 1B is a table showing other information used for offset processing referred to as SAO.
FIG. 1C is a table showing other information used for offset processing referred to as SAO.
FIG. 1D is a table showing other information used for offset processing referred to as SAO.

FIG. 10A is a diagram for illustrating, in Embodiment 1, an exemplary sequence of parameters included in SAO information, and an exemplary decoding order of the parameters.

FIG. 10B is a diagram corresponding to the flow chart of FIG. 3 and for illustrating an exemplary sequence of parameters included in SAO information, and an exemplary decoding order of the parameters.

FIG. 10C is a diagram for illustrating, in Embodiment 1, another exemplary sequence of parameters included in SAO information, and another exemplary decoding order of the parameters.

FIG. 13A is a table showing a syntax for generating a conventional bit stream.

FIG. 13B is a table showing a syntax for generating a bit stream in Embodiment 2.

FIG. 14 is a table showing a syntax for generating another bit stream in Embodiment 2.

FIG. 22 is a diagram showing a structure of multiplexed data.

FIG. 33 is an exemplary look-up table in which video data standards are associated with driving frequencies.

DESCRIPTION OF EMBODIMENTS

Figure 2:
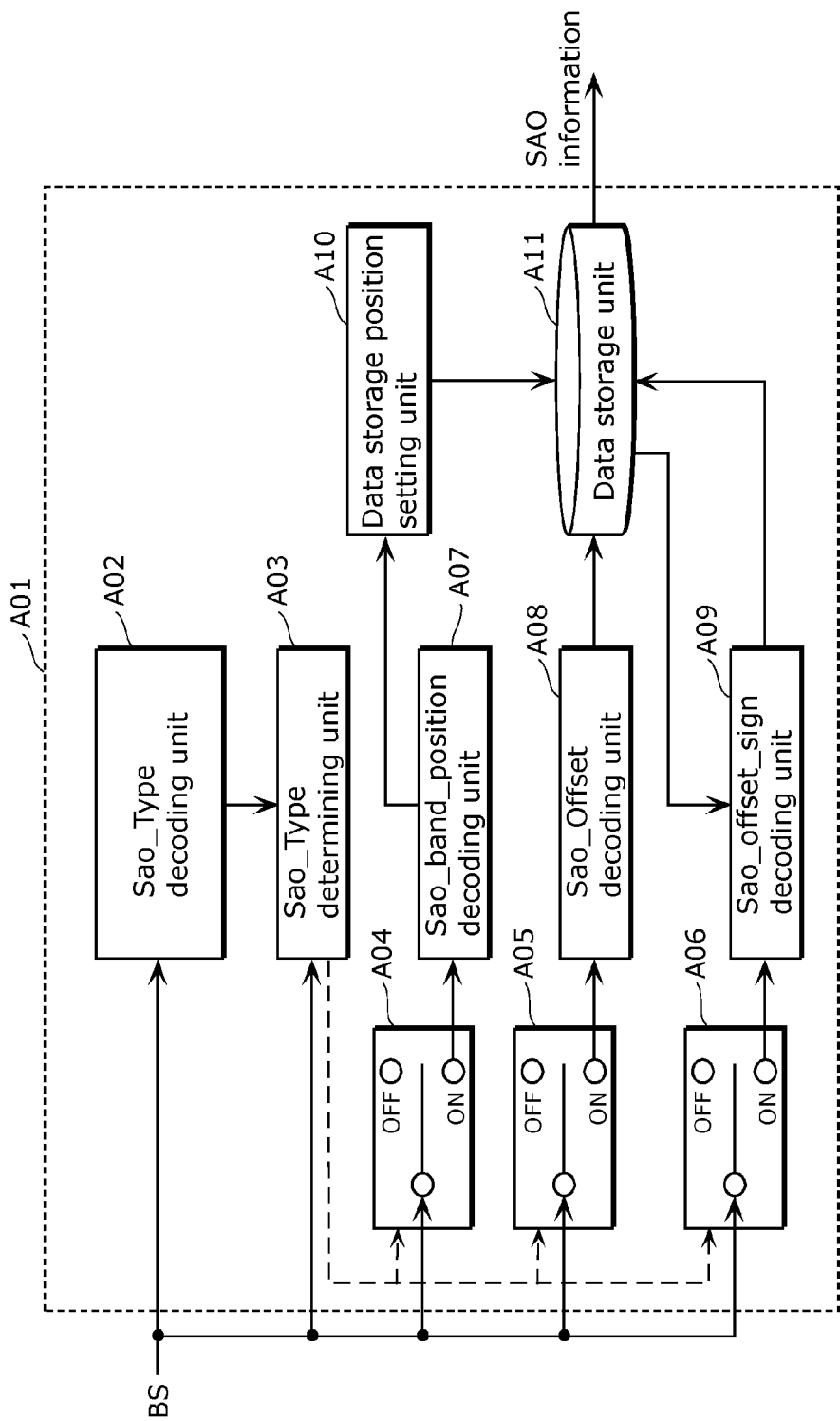
FIG. 2 is a block diagram showing a functional configuration of a SAO information decoding unit.

Underlying Knowledge Forming Basis of the Present Disclosure

FIGS. 1A to 1D are diagrams showing four types of information used for offset processing referred to as SAO. These four types of information (parameters) are SAO type information (sao_type_idx), SAO pixel value band position information (sao_band_position), a SAO offset value (sao_offset[i]), and a SAO offset sign (sao_offset_sign[i]). It is to be noted that these information items are collectively referred to as SAO information.

As shown in FIG. 1A, the SAO type information (sao_type_idx) indicates not performing offset processing or a type of offset processing to be performed. Examples of the offset processing include edge offset in which offset processing is performed on a pattern in an edge direction and band offset in which offset processing is performed on pixel values included in a certain band (range of predetermined pixel values). In addition, the edge offset is further classified into several types depending on edge directions. For instance, in NPL 3, contents indicated by SAO type information are classified into six types as shown in FIG. 1A. Arithmetic coding (context adaptive binary arithmetic coding) is performed on part of the SAO type information using a context corresponding to a variable probability value, and the part of the SAO type information is stored in a bit stream.

The SAO pixel value band position information (sao_band_position) is information used for the band offset. For example, the level band (0 to 255 in the case of 8 bits) of an image signal to be processed is divided into 32 sections. The SAO pixel value band position information indicates from which section the band offset is applied to a section (at least one continuous section) among the 32 sections. For instance, in NPL 3, the number of continuous sections is four. When the SAO pixel value band position information indicates 1 and the image signal has 8 bits, the SAO pixel value band position information indicates that the offset processing is performed on the sections of pixel values 8 to 15, pixel values 16 to 23, pixel values 24 to 31, and pixel values 32 to 39. As shown by "XXXXX" in FIG. 1B, the SAO pixel value band position information has a fixed length of 5 bits, is coded by bypass arithmetic coding using not a variable probability value but a fixed probability value, and is stored in a bit stream.

The SAO offset value (sao_offset[i]) indicates the type of the edge offset indicated by the SAO type information or an offset value actually given to the section (the at least one continuous section) indicated by the SAO pixel value band position information. It is to be noted i indicates one of the types or sections. To put it another way, the SAO offset value indicates, for each i, an offset value corresponding to a type of the edge offset or a section of the band offset indicated by the i. For example, in NPL 3, the i takes one of four values from 0 to 3. Stated differently, in the case of an offset value for the edge offset, the SAO offset value indicates, for each edge direction (each of 0, 45, 90, and 135 degrees), a value from 0 to 7 for a corresponding one of four types of patterns (e.g., V type, Λ type, / type, and \ type) as the offset value. In the case of an offset value for the band offset, the SAO offset value indicates a value from 0 to 7 for a corresponding one of the four sections as the offset value. Then, the arithmetic coding is performed on part of the SAO offset value using the context, and is stored in a bit stream. (refer to FIG. 1C)

The SAO offset sign (sao_offset_sign[i]) indicates the sign of the SAO offset value. It is to be noted that i is the same as the i used for the SAO offset value, and associates a SAO offset value and a SAO offset sign. For instance, in NPL 3, when, the SAO type information indicates the edge offset, the SAO sign is not used, and an offset value indicated by the SAO offset value is handled as always being positive. Thus, the SAO offset sign is not described in a bit stream. In contrast, when the SAO type information indicates the band offset, SAO offset signs are used for respective SAO offset values of the four sections. Thus, the SAO offset signs are coded by the bypass arithmetic coding, and are stored in the bit stream. (refer to FIG. 1D)

Figure 3:
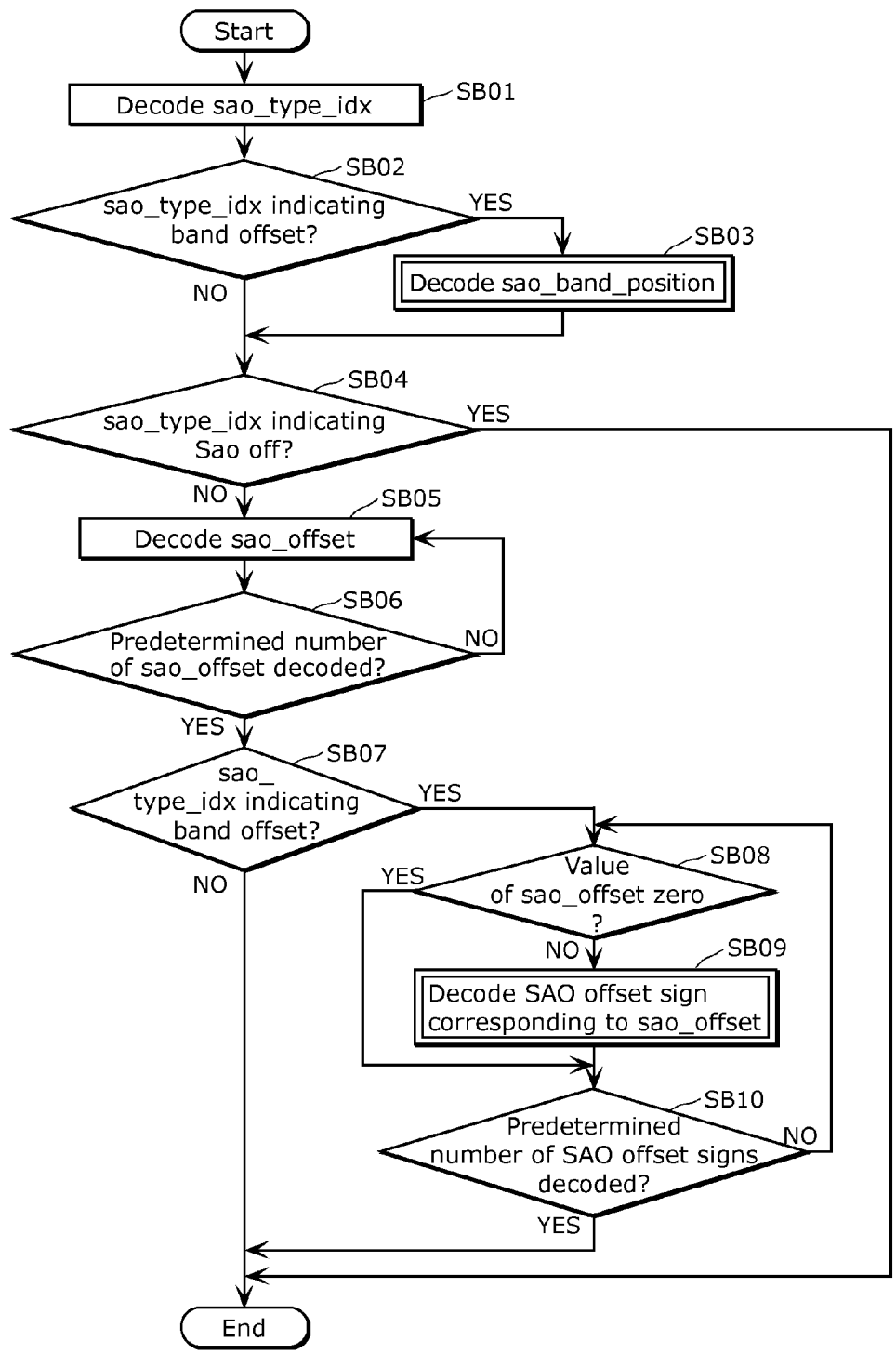
FIG. 3 is a flow chart showing an operation flow of the SAO information decoding unit.

The following describes a conventional example of a method for decoding SAO information (the four types), with reference to FIG. 2 and FIG. 3.

FIG. 2 is a block diagram showing a functional configuration of a SAO information decoding unit.

A SAO information decoding unit A01 performs variable length decoding (arithmetic decoding) on the SAO type information (sao_type_idx), the SAO pixel value band position information (sao_band_position), the SAO offset value (sao_offset[i]), and the SAO offset sign (sao_offset_sign[i]) that are included in the SAO information.

The SAO information decoding unit A01 includes: a Sao_Type decoding unit A02 that decodes SAO type information; a Sao_Type determining unit A03 that determines a type of offset processing or the like indicated by the SAO type information; switches A04, A05, and A06; a Sao_band_position decoding unit A07 that decodes SAO pixel value band position information; a Sao_Offset decoding unit A08 that decodes a SAO offset value; a Sao_offset_sign decoding unit A09 that decodes a SAO offset sign; a data storage position setting unit A10; and a data storage unit A11. The SAO information decoding unit A01 restores SAO information from a bit stream BS.

The operation of the SAO information decoding unit A01 is described in details with reference to FIG. 3.

FIG. 3 is a flow chart showing an exemplary operation flow of the SAO information decoding unit A01.

First, the Sao_Type decoding unit A02 of the SAO information decoding unit A01 decodes SAO type information (sao_type_idx) from a bit stream BS (SB01). Next, the Sao_Type determining unit A03 determines whether or not the sao_type_idx indicates band offset in which offset processing is performed on pixel values included in a certain band (range of predetermined pixel values) (SB02). When determining that the band offset is indicated (YES in SB02), the Sao_Type determining unit A03 turns the switch A04 ON. With this, the Sao_band_position decoding unit A07 decodes SAO pixel value band position information (sao_band_position) (SB03). The data storage position setting unit A10 determines a storage position in the data storage unit A11 based on the decoded SAO pixel value band position information. In contrast, when determining that the band offset is not indicated (NO in SB02), the Sao_Type determining unit A03 turns the switch A04 OFF. Next, the Sao_Type determining unit A03 determines whether or not the sao_type_idx indicates that the offset processing is not to be performed (Sao off) (SB04). Here, when determining that Sao off is indicated (YES in SB04), the Sao_Type determining unit A03 turns the switches A04, A05, and A06 OFF, and terminates decoding of the SAO information.

In contrast, when determining that Sao off is not indicated (NO in SB04), the Sao_Type determining unit A03 turns the switch A05 ON. With this, the Sao_Offset decoding unit A08 decodes a SAO offset value (sao_offset) from the bit stream BS (SB05). It is to be noted that the decoded SAO offset value is stored at the position in the data storage unit A11 set by the data storage position setting unit A10. Here, the decoding in the step SB05 is continued until a predetermined number of SAO offset values is decoded (during a period of NO in SB06). When all the SAO offset values are decoded (YES in SB06), the Sao_Type determining unit A03 determines whether or not the sao_type_idx indicates the band offset (SB07). When determining that the band offset is indicated (YES in SB07), the Sao_Type determining unit A03 turns the switch A06 ON.

With this, when the decoded SAO offset value is not zero (NO in SB08), the Sao_offset_sign decoding unit A09 decodes a SAO offset sign corresponding to the SAO offset value (SB09). In this case, the SAO offset value in the data storage unit A11 is updated using the decoded SAO offset sign. When the decoded SAO offset value is zero (YES in SB08), the SAO offset sign has no particular meaning, and thus the Sao_offset_sign decoding unit A09 skips the decoding. Here, the Sao_offset_sign decoding unit A09 continues the decoding until a predetermined number of SAO offset signs corresponding to SAO offset values is decoded (during a period of NO in SB10). When all the SAO offset signs are decoded (YES in SB10), the SAO information decoding unit A01 terminates the decoding of the SAO information.

It is to be noted that parameters that are information items decoded in steps enclosed by double frame lines in FIG. 3 are parameters decoded by bypass arithmetic decoding in which a variable probability value is not necessary. Parameters that are information items decoded in steps enclosed by regular frame lines are parameters that are information items decoded using a variable probability value that is at least part of each of the parameters, and are dispersed in a bit stream.

The following describes variable length coding such as context adaptive binary arithmetic coding using a variable probability value and bypass arithmetic coding not using a variable probability value. In H.264 or HEVC, the context adaptive binary arithmetic coding (CABAC) is one of variable length coding techniques. The CABAC is described below with reference to FIG. 4, FIG. 5, and FIG. 6.

Figure 4:
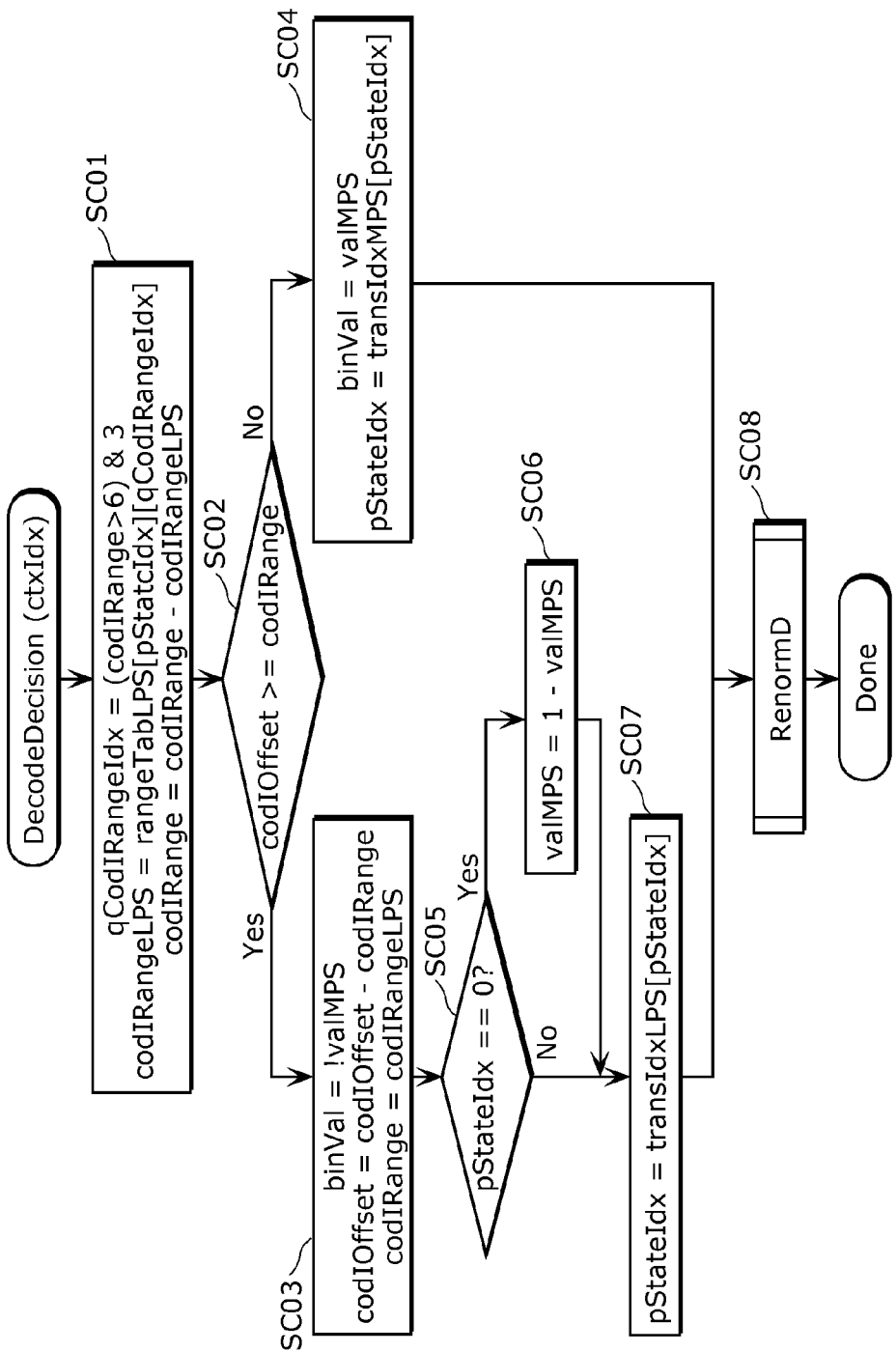
FIG. 4 is a flow chart showing context adaptive binary arithmetic decoding.

FIG. 4 is a flow chart showing context adaptive binary arithmetic decoding. It is to be noted that FIG. 4 is excerpted from NPL 2, and is as described in NPL 2, unless otherwise explained.

In the context adaptive binary arithmetic decoding, first, a context (ctxIdx) determined based on a signal type is inputted. Next, the value "qCodIRangeIdx" is calculated from the first parameter "codIRange" showing a current state in a arithmetic decoding apparatus, and pStateIdx that is a state value corresponding to ctxIdx is obtained. codI-RangeLPS is obtained by referring to a table (rangeTableLPS) using the two values. It is to be noted that the codIRangeLPS is a parameter showing a state in the arithmetic decoding apparatus when LPS (indicates a symbol having a low occurrence probability among symbols 0 and 1) occurs with respect to the first parameter "codIRange" showing the state in the arithmetic decoding apparatus.

A value obtained by subtracting the codIRangeLPS from current codIRange is put into the codIRange (step SC01). Next, the calculated codIRange is compared to the second parameter "codIOffset" showing a state in the arithmetic decoding apparatus (step SC02). When the codIOffset is greater than or equal to the codIRange (Yes in SC02), it is determined that an LPS symbol has occurred, and a value (when valMPS=1, 0; and when valMPS=0, 1) different from valMPS (which is a specific value indicating a symbol having a high occurrence probability among symbols 0 and 1, and indicates 0 or 1) is set to binVal that is a decoded output value. Moreover, a value obtained by subtracting the codIRRangeLPS from the codIRange is set to the second parameter "codIOffset" showing the state in the arithmetic decoding apparatus. Because LPS has occurred, the value of the codIRangeLPS calculated in step SC01 is set to the first parameter "codIRange" showing the state in the arithmetic decoding apparatus (step SC03). It is to be noted that because a case where pStateIdx that is a state value corresponding to the ctxIdx is 0 (Yes in step SC05) indicates a case where the probability of the LPS is greater than that of MPS, the valMPS is replaced with the different value (when valMPS=1, 0; and when valMPS=0, 1) (step SC06). In contrast, when the pStateIdx is not 0 (No in step SC05), the pStateIdx is updated based on the translation table when the LPS occurs (step SC07).

When the codIOffset is small (No in SC02), it is determined that an the MPS symbol has occurred, the valMPS is set to the binVal, the decoded output value, and the pStateIdx is updated based on the translation table "transIdxMPS" when the MPS occurs (step SC04).

Lastly, a normalization process (RenormD) is performed (step SC08), and the context adaptive binary arithmetic decoding is terminated.

As above, in the context adaptive binary arithmetic decoding, because symbol occurrence probabilities (probability values), binary symbol occurrence probabilities, are held in association with context indexes, and are switched according to conditions (e.g., by referring to the value of an adjacent block), it is necessary to maintain a processing order.

Figure 5:
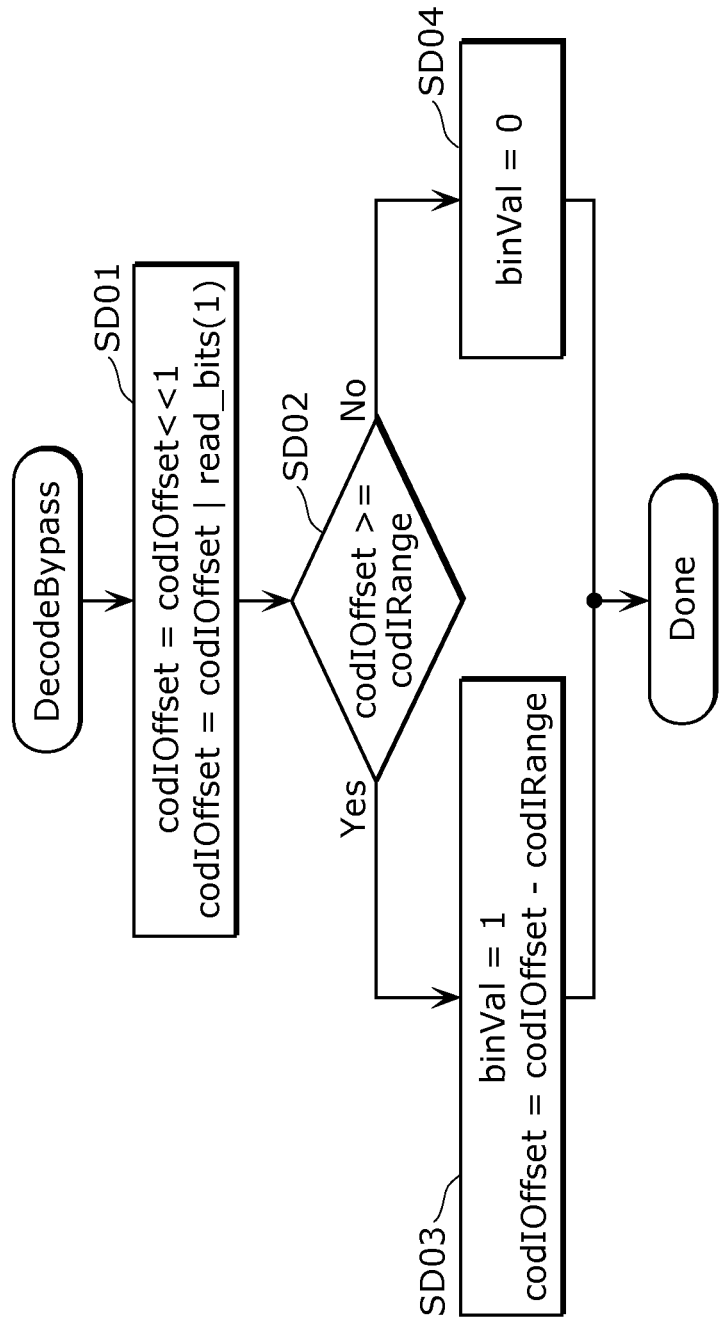
FIG. 5 is a flow chart showing bypass arithmetic decoding.

FIG. 5 is a flow chart showing bypass arithmetic decoding. It is to be noted that FIG. 5 is excerpted from NPL 2, and is as described in NPL 2, unless otherwise explained.

First, the second parameter "codIOffset" showing the current state in the arithmetic decoding apparatus is shifted to the left (doubled), 1 bit is read from a bit stream, and when the read bit has 1, 1 is further added to the (doubled) value, and when the read bit has 0, the (doubled) value is set (SD01).

Next, when the codIOffset is greater than or equal to the first parameter "codIRange" showing the state in the arithmetic decoding apparatus (Yes in SD02), "1" is set to the binVal, the decoded output value, a value obtained by subtracting the codIRange from the codIOffset is set to the codIOffset (step SD03). In contrast, when the codIOffset is less than the first parameter "codIRange" showing the state in the arithmetic decoding apparatus (No in SD02), "0" is set to the binVal, the decoded output value (step SD04).

Figure 6:
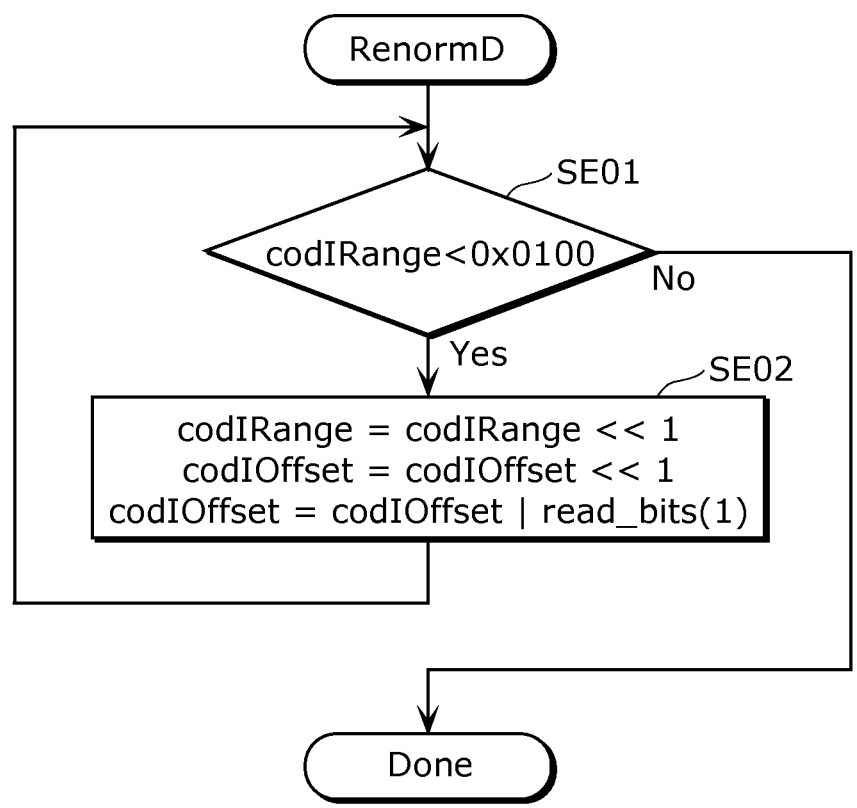
FIG. 6 is a flow chart showing a normalization process in an arithmetic decoding method.

FIG. 6 is a flow chart for illustrating in more detail the normalization process (RenormD) in step SC08 shown in FIG. 4. It is to be noted that FIG. 6 is excerpted from NPL 2, and is as described in NPL 2, unless otherwise explained.

In the context adaptive binary arithmetic decoding, when the first parameter "codIRange" showing the state in the arithmetic decoding apparatus becomes less than 0x100 (hexadecimal: 256 (decimal)) (Yes in step SE01), the codIRange is shifted to the left (doubled), the second parameter "codIOffset" showing the state in the arithmetic decoding apparatus is shifted to the left (doubled), 1 bit is read from a bit stream, and when the read bit has 1, 1 is further added to the (doubled) value, and when the read bit has 0, the (doubled) value is set (SE02).

When the codIRange finally becomes greater than or equal to 256 through this process (No in step SE01), the normalization process is terminated.

The arithmetic decoding is performed by performing the above steps.

However, as stated above, because importance is placed on enhancement of data storability in the method shown in NPL 3, a parallel processing capability in the arithmetic coding or arithmetic decoding, arrangement of coded bits, or the like is insufficient, and a redundant bit length is necessary. As a result, a burden is imposed on the coding and decoding of SAO information.

In view of the above, the present disclosure provides a moving picture coding method, a moving picture coding apparatus, a moving picture decoding method, a moving picture decoding apparatus, and so on which can make processing efficient without reducing coding efficiency while maintaining the data storability, when the arithmetic coding or arithmetic decoding is performed on the SAO information that is information necessary for SAO. It is to be noted that hereinafter, there may be a case where the term "coding" is used in the sense of "encoding."

A moving picture coding method according to an aspect of the present disclosure is a moving picture coding method for coding an input image to generate a bit stream, the method including: performing context adaptive binary arithmetic coding in which a variable probability value is used, on first information among multiple types of sample adaptive offset (SAO) information used for SAO that is a process of assigning an offset value to a pixel value of a pixel included in an image generated by coding the input image; and continuously performing bypass arithmetic coding in which a fixed probability value is used, on second information and third information among the multiple types of the SAO information, wherein the coded second and third information are placed after the coded first information in the bit stream.

Here, the context adaptive binary arithmetic coding cannot be performed in parallel, and the bypass arithmetic coding can be performed in parallel on a bit basis. Thus, in the moving picture coding method according to the aspect of the present disclosure, because the bypass arithmetic coding of the second information and the bypass arithmetic coding of the third information are performed not intermittently but continuously due to the context adaptive binary arithmetic coding of the first information, it is possible to increase an amount of information that can be processed in parallel. As a result, it is possible to make the parallel processing efficient. For instance, it is possible to increase a parallel processing capability by increasing the number of bits on which the bypass arithmetic coding is performed in parallel. Moreover, because a probability value is fixed in the bypass arithmetic coding, it is possible to previously perform, before a symbol to be coded is obtained, arithmetic coding when the symbol is 0 and arithmetic coding when the symbol is 1 in parallel. In other words, it is possible to previously perform, for each occurrence pattern of symbol, arithmetic coding corresponding to the occurrence pattern. To put it differently, it is possible to previously perform look-ahead processing in the bypass arithmetic coding. Thus, it is possible to effectively use the look-ahead processing by continuously performing the bypass arithmetic coding of the second information and the bypass arithmetic coding of the third information.

Furthermore, because, in the bit stream generated by the moving picture coding method according to the aspect of the present disclosure, the second and third information on which the bypass arithmetic coding is performed are placed after the first information on which the context adaptive binary arithmetic coding is performed, without being divided by the first information, the moving picture decoding apparatus is also allowed to easily decode the second and third information continuously by bypass arithmetic decoding. As a result, it is also possible to make the parallel processing efficient when the decoding is performed. Moreover, because, in the bit stream, the first information on which the context adaptive binary coding is performed is placed before the second and third information on which the bypass arithmetic coding is performed, the moving picture decoding apparatus is allowed to start bypass arithmetic decoding of the second information and bypass arithmetic decoding of the third information before context adaptive binary arithmetic decoding of the first information. As a result, the moving picture decoding apparatus is capable of start decoding the second and third information before the end of decoding of the first information. With this, it is possible to increase the speed of processing.

Moreover, one of the second information and the third information may be sao_band_position indicating a range of pixel values to which the SAO is applied.

With this, it is possible to efficiently code the sao_band_position. Moreover, for instance, when the first information is the sao_offset indicating the absolute value of an offset value, the sao_band_position is placed after the sao_offset in the bit stream. With this, in the moving picture decoding apparatus, because the sao_band_position is decoded after the sao_offset, even when the sao_offset is decoded, as long as the sao_band_position is not decoded, it is not possible to store the decoded sao_offset at a storage position in a memory associated with a range (position) of pixel values indicated by the sao_band_position. However, it is possible to appropriately apply the absolute value of the offset value indicated by the sao_offset to pixels values included in the range of pixel values indicated by the sao_band_position, by storing the decoded sao_offset in the memory regardless of the range and associating the decoded sao_offset with the sao_band_position to be decoded. As a result, it is possible to make the processing efficient and properly perform the SAO.

Moreover, the other of the second information and the third information may be sao_offset_sign indicating whether an offset value is positive or negative, the offset value being assigned to a pixel value to which the SAO is applied.

With this, it is possible to efficiently code the sao_offset_sign. Moreover, for example, when the first information is the sao_offset indicating the absolute value of the offset value, the sao_band_sign is placed after the sao_offset in the bit stream. Here, when the absolute value of the offset value indicated by the sao_offset is 0, it is possible to omit the sao_offset_sign. As a result, it is possible to increase coding efficiency.

Moreover, in the continuously performing, the sao_band_position may be coded after the sao_offset_sign is coded.

With this, for instance, when the first information is the sao_offset indicating the absolute value of the offset value, the sao_offset, the sao_offset_sign, and the sao_band_position are placed in the bit stream in this order. As a result, the moving picture decoding apparatus makes it possible to decode the sao_offset and the sao_offset_sign before the sao_band_position, and is thus capable of quickly determining an offset value assigned to a pixel value without waiting the decoding of the sao_band_position. Consequently, it is possible to readily store the offset value into the memory.

Moreover, a pixel to which the SAO is applied may include components of multiple types, and the first information, the second information, and the third information may be coded for each of the components.

With this, for example, when the components of the multiple types are a luminance and a chrominance, in the bit stream, coded first information applied to the luminance and coded second information and coded third information applied to the luminance are collectively placed, and coded first information applied to the chrominance and code second information and coded third information are collectively placed. As a result, the moving picture decoding apparatus makes it possible to decode only one of SAO information applied to the luminance and SAO information applied to the chrominance as necessary. In other words, when the SAO is performed only on the luminance, it is possible to prevent the SAO information applied to the chrominance from being unnecessarily decoded. As a result, it is possible to make the processing efficient.

Moreover, in the continuously performing, the bypass arithmetic coding may be further performed on at least one other information among the multiple types of the SAO information immediately before or immediately after the coding of the second information and the third information.

With this, it is possible to further increase an amount of information that can be continuously processed in parallel, and thus it is possible to make the parallel processing more efficient.

Moreover, the first information may be part of sao_type_idx indicating that the SAO is not to be performed or a type of the SAO.

With this, it is possible to prevent parallel processing efficiency for the second information and the third information from decreasing due to the context adaptive binary arithmetic coding of the sao_type_idx.

A moving picture decoding method according to another aspect of the present disclosure is a moving picture decoding method for decoding a coded image included in a bit stream, the method including: performing context adaptive binary arithmetic decoding in which a variable probability value is used, on first information among multiple types of SAO information that are included in the bit stream and used for sample adaptive offset (SAO) which is a process of assigning an offset value to a pixel value of a pixel included in an image generated by decoding the coded image; and continuously performing bypass arithmetic decoding in which a fixed probability value is used, on second information and third information that are among the multiple types of the SAO information and located after the first information in the bit stream.

Here, the context adaptive binary arithmetic decoding cannot be performed in parallel, and the bypass arithmetic decoding can be performed in parallel on a bit basis. Thus, in the moving picture decoding method according to the other aspect of the present disclosure, because the bypass arithmetic decoding of the second information and the bypass arithmetic decoding of the third information are performed not intermittently but continuously due to the context adaptive binary arithmetic decoding of the first information, it is possible to increase an amount of information that can be processed in parallel. As a result, it is possible to make the parallel processing efficient. For instance, it is possible to increase a parallel processing capability by increasing the number of bits on which the bypass arithmetic decoding is performed in parallel. Moreover, because a probability value is fixed in the bypass arithmetic decoding, it is possible to previously perform, before data to be decoded is obtained, arithmetic decoding when the symbol is 0 and arithmetic decoding when the symbol is 1 in parallel. In other words, it is possible to previously perform, for each occurrence pattern of symbol, arithmetic decoding corresponding to the occurrence pattern. To put it differently, it is possible to previously perform look-ahead processing in the bypass arithmetic decoding. Thus, it is possible to effectively use the look-ahead processing by continuously performing the bypass arithmetic decoding of the second information and the bypass arithmetic decoding of the third information.

Moreover, because, in the bit stream, the first information on which the context adaptive binary coding is performed is placed before the second and third information on which the bypass arithmetic coding is performed, it is possible to start context adaptive binary arithmetic decoding of the first information before the bypass arithmetic decoding of the second information and the bypass arithmetic decoding of the third information. As a result, it is possible to start decoding the second and third information before the end of decoding of the first information. With this, it is possible to increase the speed of processing.

Moreover, one of the second information and the third information may be sao_band_position indicating a range of pixel values to which the SAO is applied.

With this, it is possible to efficiently decode the sao_band_ position. Moreover, for instance, when the first information is the sao_offset indicating the absolute value of an offset value, the sao_band_position is placed after the sao_offset in the bit stream. With this, because the sao_band_ position is decoded after the sao_offset, even when the sao_offset is decoded, as long as the sao_band_position is not decoded, it is not possible to store the decoded sao_offset at a storage position in a memory associated with a range (position) of pixel values indicated by the sao_band_position. However, it is possible to appropriately apply the absolute value of the offset value indicated by the sao_offset to pixels values included in the range of pixel values indicated by the sao_band_position, by storing the decoded sao_offset in the memory regardless of the range and associating the decoded sao_offset with the sao_band_position to be decoded. As a result, it is possible to make the processing efficient and properly perform the SAO.

Moreover, the other of the second information and the third information may be sao_offset_sign indicating whether an offset value is positive or negative, the offset value being assigned to a pixel value to which the SAO is applied.

With this, it is possible to efficiently decode the sao_offset_sign. Moreover, for example, when the first information is the sao_offset indicating the absolute value of the offset value, the sao_band_sign is placed after the sao_offset in the bit stream. Here, when the absolute value of the offset value indicated by the sao_offset is 0, the sao_offset_sign is omitted. As a result, it is possible to properly decode the bit stream for which the coding efficiency is increased.

Moreover, in the continuously performing, the sao_band_position may be decoded after the sao_offset_sign is decoded.

With this, for example, when the first information is the sao_offset indicating the absolute value of the offset value, the sao_offset and the sao_offset_sign are decoded before the sao_band_position, and thus an offset value assigned to a pixel value can be quickly determined without waiting the decoding of the sao_band_position. Consequently, it is possible to readily store the offset value into the memory.

Moreover, a pixel to which the SAO is applied may include components of multiple types, and the first information, the second information, and the third information may be coded for each of the components.

With this, for instance, when the components of the multiple types are a luminance and a chrominance, it is possible to decode only one of SAO information applied to the luminance and SAO information applied to the chrominance as necessary. In other words, when the SAO is performed only on the luminance, it is possible to prevent the SAO information applied to the chrominance from being unnecessarily decoded. As a result, it is possible to make the processing efficient.

Moreover, in the continuously performing, the bypass arithmetic decoding may be performed on at least one other information among the multiple types of the SAO information immediately before or immediately after the decoding of the second information and the third information.

With this, it is possible to further increase an amount of information that can be continuously processed in parallel, and thus it is possible to make the parallel processing more efficient. Moreover, the first information may be part of sao_type_idx indicating that the SAO is not to be performed or a type of the SAO.

With this, it is possible to prevent parallel processing efficiency for the second information and the third information from decreasing due to the context adaptive binary arithmetic decoding of the sao_type_idx.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

Figure 7:
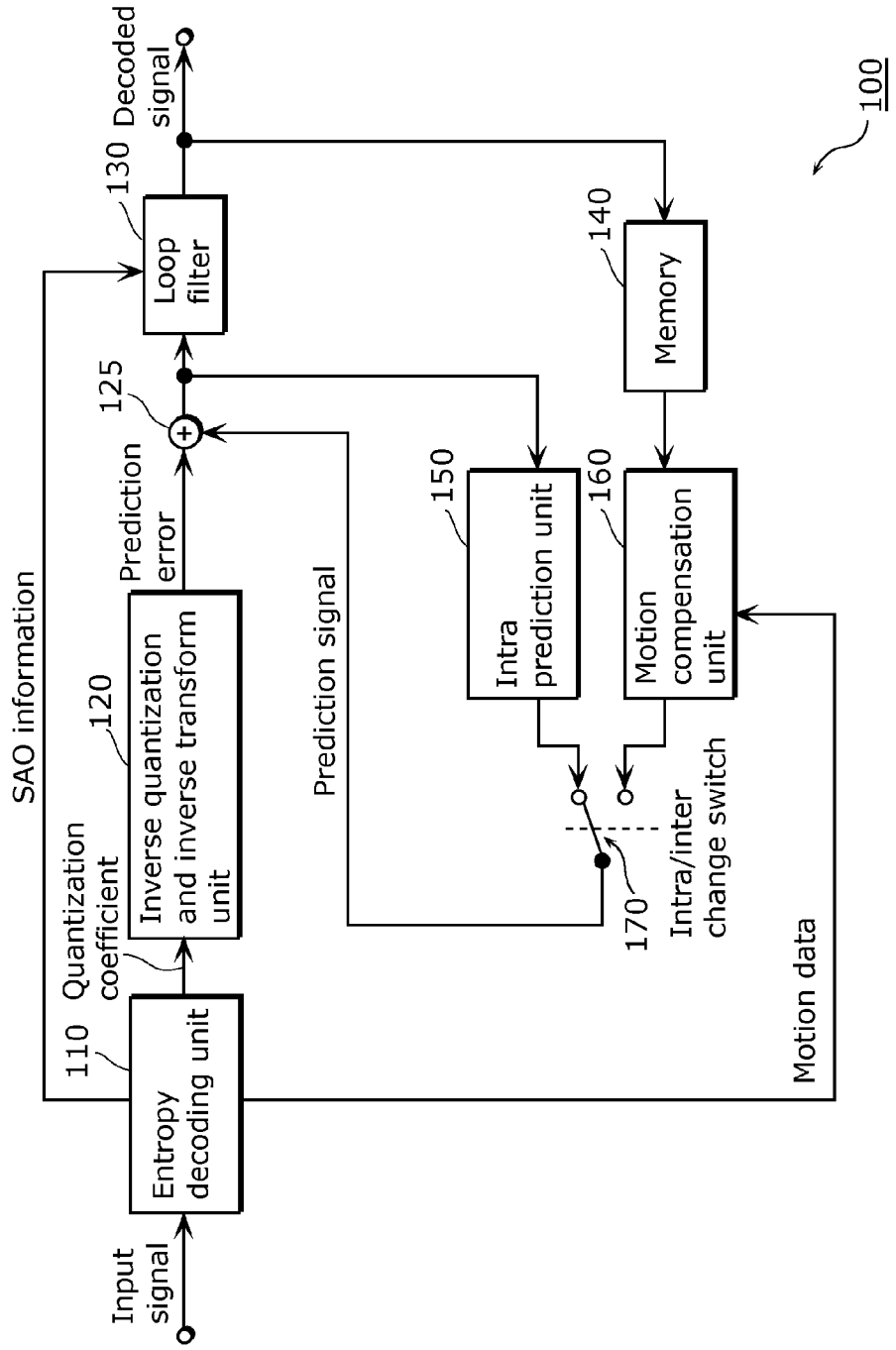
FIG. 7 is a block diagram showing an exemplary configuration of a moving picture decoding apparatus according to Embodiment 1.

FIG. 7 is a block diagram showing an exemplary configuration of a moving picture decoding apparatus 100 according to Embodiment 1.

The moving picture decoding apparatus 100 decodes compression-coded image data. For instance, coded image data (a bit stream) is inputted, on a block-by-block basis, to the moving picture decoding apparatus 100 as signals to be decoded (input signals). The moving picture decoding apparatus 100 reconstructs image data by performing variable length decoding, inverse quantization, and inverse transform on the inputted signals to be decoded.

As shown in FIG. 7, the moving picture decoding apparatus 100 includes an entropy decoding unit 110, an inverse quantization and inverse transform unit 120, an adder 125, a loop filter 130, a memory 140, an intra prediction unit 150, a motion compensation unit 160, and an intra/inter change switch 170.

The entropy decoding unit 110 performs variable length decoding on an input signal, to reconstruct a quantization coefficient. It is to be noted that here, the input signal is a signal to be decoded, and corresponds to coded image data for each block. Moreover, the entropy decoding unit 110 obtains motion data from the input signal, and outputs the obtained motion data to the motion compensation unit 160. Furthermore, the entropy decoding unit 110 performs variable length decoding on the input signal, to reconstruct SAO information, and outputs the SAO information to the loop filter 130.

The inverse quantization and inverse transform unit 120 performs inverse quantization on the quantization coefficient reconstructed by the entropy decoding unit 110, to reconstruct a transform coefficient. Then, the inverse quantization and inverse transform unit 120 performs inverse transform on the reconstructed transform coefficient, to reconstruct a prediction error.

The adder 125 adds the reconstructed prediction error to a prediction signal, to generate a decoded image.

The loop filter 130 performs a loop filter process on the generated decoded image. The decoded image on which the loop filter process has been performed is outputted as a decoded signal. It is to be noted that the loop filter process includes SAO.

The memory 140 is a memory for storing reference images used for motion compensation. Specifically, the memory 140 stores decoded images on which the loop filter process has been performed.

The intra prediction unit 150 performs intra prediction to generate a prediction signal (intra-prediction signal). Specifically, the intra prediction unit 150 performs intra prediction by referring to an image around a current block to be decoded (input signal) in the decoded image generated by the adder 125, to generate an intra-prediction signal.

The motion compensation unit 160 performs motion compensation based on the motion data outputted from the entropy decoding unit 110, to generate a prediction signal (inter-prediction signal).

The intra/inter change switch 170 selects either the intra-prediction signal or the inter-prediction signal, and outputs the selected signal to the adder 125 as a prediction signal.

The above configuration allows the moving picture decoding apparatus 100 according to Embodiment 1 to decode the coded image data that is the compression-coded image data.

It is to be noted that in Embodiment 1, the entropy decoding unit 110 includes a SAO information decoding unit which decodes SAO information.

Figure 8:
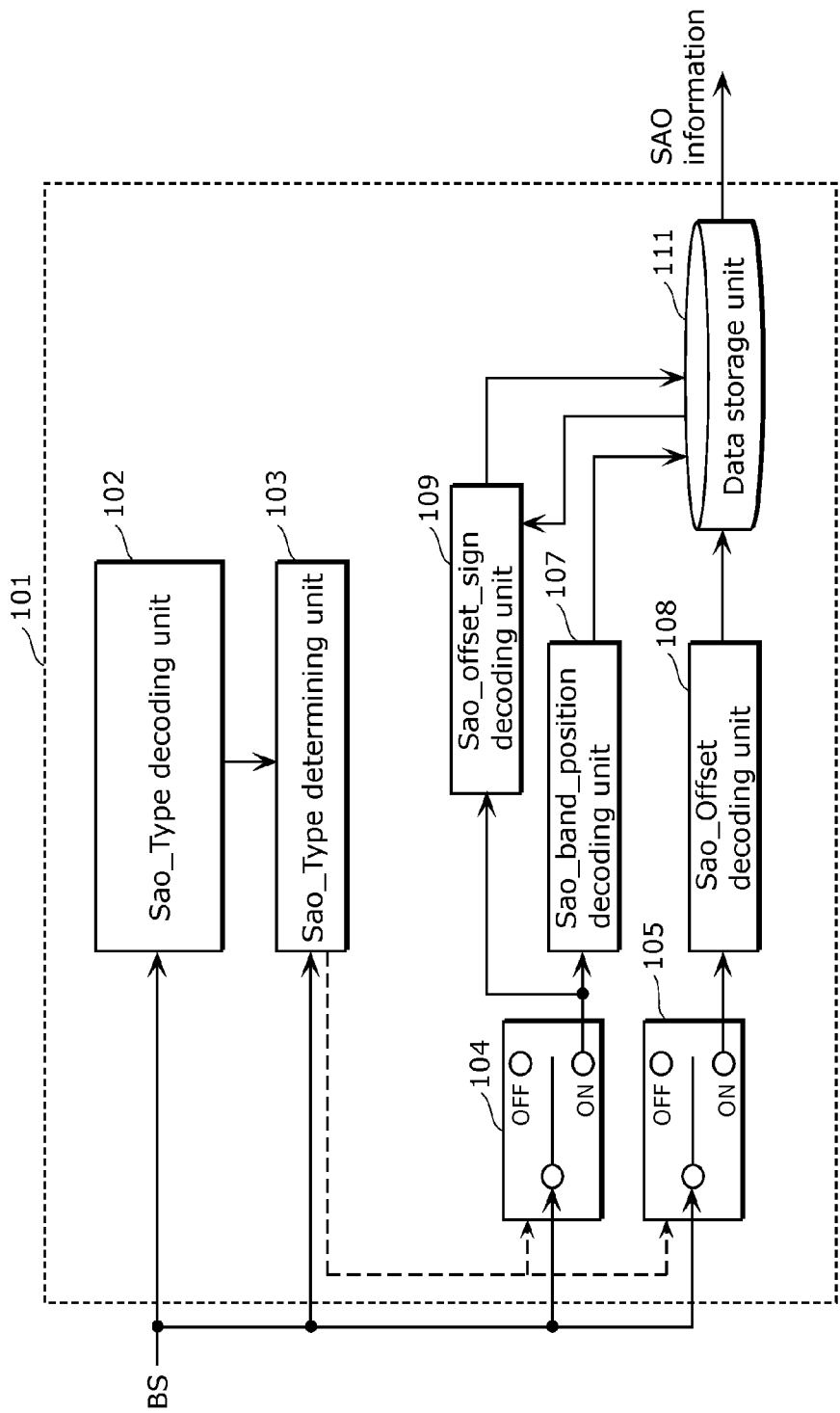
FIG. 8 is a block diagram showing a functional configuration of a SAO information decoding unit according to Embodiment 1.

FIG. 8 is a block diagram showing a functional configuration of a SAO information decoding unit according to Embodiment 1.

A SAO information decoding unit 101 reconstructs SAO information from a bit stream BS. In other words, the SAO information decoding unit 101 performs variable length decoding on SAO type information (sao_type_idx), SAO pixel value band position information (sao_band_position), a SAO offset value (sao_offset[i]), and a SAO offset sign (sao_offset_sign[i]) on which variable length coding has been performed and that are included in the SAO information.

Specifically, the SAO information decoding unit 101 includes: a Sao_Type decoding unit 102 that decodes SAO type information; a Sao_Type determining unit 103 that determines a type of offset processing indicated by the SAO type information or the like; switches 104 and 105; a Sao_band_position decoding unit 107 that decodes SAO pixel value band position information; a Sao_Offset decoding unit 108 that decodes a SAO offset value; a Sao_offset_sign decoding unit 109 that decodes a SAO offset sign; and a data storage unit 111.

Figure 9:
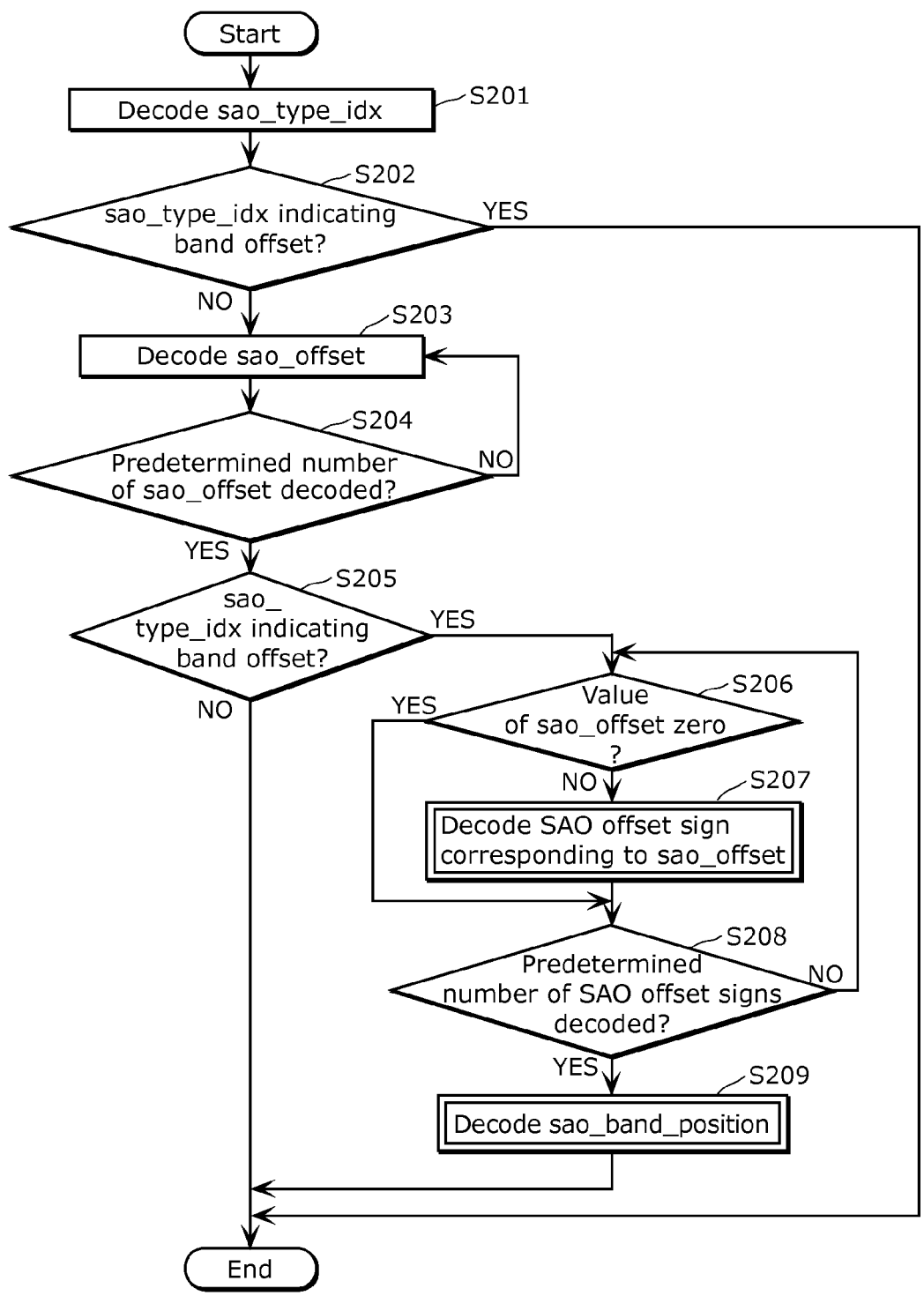
FIG. 9 is a flow chart showing arithmetic decoding by the SAO information decoding unit according to Embodiment 1.

The operation of the SAO information decoding unit 101 is described in details with reference to FIG. 9.

FIG. 9 is a flow chart showing an exemplary flow of arithmetic decoding by the SAO information decoding unit 101.

First, the Sao_Type decoding unit 102 of the SAO information decoding unit 101 decodes SAO type information (sao_type_idx) from a bit stream BS (S201). Next, the Sao_Type determining unit 103 determines whether or not the sao_type_idx indicates that SAO is not to be performed (Sao off) (S202). Here, when determining that the sao_type_idx indicates that the SAO is not to be performed (YES in S202), the Sao_Type determining unit 103 turns the switches 104 and 105 OFF, and terminates arithmetic decoding of SAO information, because the SAO information other than the SAO type information is not included in the bit stream BS.

In contrast, when determining that the sao_type_idx indicates that the SAO is to be performed (NO in S202), the Sao_Type determining unit 103 turns the switch 105ON. With this, the Sao_Offset decoding unit 108 decodes a SAO offset value (sao_offset) from the bit stream BS (S203). It is to be noted that the Sao_Offset decoding unit 108 stores the decoded SAO offset value into an offset register ensured in advance or a memory portion inside the data storage unit 111. Here, the Sao_Offset decoding unit 108 continues the decoding in step S203 until a predetermined number of SAO offset values is decoded (during a period of NO in S204). When the Sao_Offset decoding unit 108 decodes all SAO offset values (YES in S204), the Sao_Type determining unit 103 determines whether or not the sao_type_idx indicates band offset in which offset processing is performed on pixel values included in a certain band (range of predetermined pixel values) (S205).

Here, when determining that the band offset is not indicated (NO in S205), the Sao_Type determining unit 103 turns the switch 104 OFF, and terminates arithmetic decoding of all SAO information. In contrast, when determining that the band offset is indicated (YES in S205), the Sao_Type determining unit 103 turns the switch 104 ON. With this, when the decoded SAO offset value is not zero (NO in S206), the Sao_offset_sign decoding unit 109 decodes a SAO offset sign corresponding to the SAO offset value (S207). In this case, the SAO offset value in the data storage unit A11 is updated using the decoded SAO offset sign. When the decoded SAO offset value is zero (YES in S206), the SAO offset sign has no particular meaning, and thus the Sao_offset_sign decoding unit 109 skips the decoding. Here, the Sao_offset_sign decoding unit 109 continues the decoding until a predetermined number of SAO offset signs corresponding to SAO offset values is decoded (during a period of NO in S208). When all SAO offset signs are decoded (YES in S208), the Sao_band_position decoding unit 107 decodes SAO pixel value band position information (sao_band_position) (S209). The SAO pixel value band position information indicates which offset value of a pixel value band (section) the SAO offset value is, and thus the SAO pixel value band position information is stored into the data storage unit 111. Alternatively, a storage position in the data storage unit 111 is changed based on the SAO pixel value band position information. This processing allows the SAO information to be decoded correctly.

It is to be noted that although the SAO type information is always decoded from the bit stream BS here, the present disclosure is not limited to this. For instance, SAO type information in a region to be processed may be derived according to a predetermined rule (e.g., a rule that SAO type information that is the same as SAO type information in the left region is to be used), and the SAO type information may be decoded. In this case, the SAO type information is not necessarily described in a bit stream.

In this embodiment, because an order of multiple types of information (parameters) included in SAO information is different from an order shown in FIG. 3, it is possible to reduce an amount of processing, make the processing efficient, and properly decode a bit stream for which coding efficiency is increased.

It is to be noted that parameters that are information items decoded in steps enclosed by double frame lines in FIG. 9 are parameters decoded by the bypass arithmetic decoding. Parameters that are information items decoded in steps enclosed by regular frame lines are parameters on which context adaptive binary arithmetic processing is performed using a variable probability value that is at least part of each of the parameters. In the moving picture decoding method in this embodiment, as shown in FIG. 9, the parameters of the multiple types are decoded collectively (continuously) by bypass arithmetic decoding in the latter part of the bit stream BS in comparison with the method shown in FIG. 3.

It is to be noted that in the case of a parameter whose symbol occurrence probability is not approximately 50%, performing context adaptive binary arithmetic coding in which a variable probability value is used on the parameter makes it possible to increase the coding efficiency due to an information bias. For this reason, context adaptive binary arithmetic decoding is performed on the parameter thus coded (see FIG. 4). In contrast, in the case of a parameter whose possible value has a wide range or a parameter whose symbol occurrence probability is approximately 50%, the symbol occurrence probability of the parameter is deemed 50%, and it is possible to reduce an amount of processing by performing bypass arithmetic coding on the parameter. In other words, performing bypass arithmetic decoding on a SAO offset sign corresponding to a SAO offset value and SAO pixel value band position information (see FIG. 5) makes it possible to reduce the amount of processing. In addition, in this bypass arithmetic decoding, the normalization process is performed according to the flow shown in FIG. 6.

FIG. 10A is a diagram for illustrating, in this embodiment, an exemplary sequence of parameters included in SAO information, and an exemplary decoding order of the parameters.

(a) in FIG. 10A shows an example where decoding of SAO information is performed in one parallel. As shown by (a) in FIG. 10A, in the moving picture decoding method in this embodiment, SAO_OFFSET, SAO_OFFSET_SIGN, and SAO_BAND_POSITION, that is, information items (parameters) included in a bit stream BS are decoded in this order. It is to be noted that in FIG. 10A to FIG. 10C, a SAO offset value, a SAO offset sign, and SAO pixel value band position information are shown as SAO_OFFSET, SAO_OFFSET_SIGN, and SAO_BAND_POSITION, respectively.

Bypass arithmetic decoding is performed on, among the information items, the SAO_OFFSET_SIGN and the SAO_BAND_POSITION enclosed by thick frame lines in FIG. 10A. Here, it is desirable to implement processing in parallel, because it is necessary to increase a processing speed while image resolution utilized is increased, and high-speed real time communication is widely used. However, because context adaptive binary arithmetic coding is performed on at least part of the SAO_OFFSET, it is necessary to sequentially read a symbol occurrence probability and perform an update process. For this reason, it is not possible to perform the arithmetic decoding of the SAO_OFFSET in parallel. In view of this, as shown by (b) in FIG. 10A, parts on which bypass arithmetic decoding is performed are decoded in parallel on a bit-by-bit basis. In addition, when bypass arithmetic decoding is performed in parallel, pre-calculation for bypass arithmetic decoding can be performed regardless of the internal state of the moving picture decoding apparatus 100, and thus upon obtaining information from the bit stream BS, the moving picture decoding apparatus 100 may start bypass arithmetic decoding even when context adaptive binary arithmetic decoding is not completed. This makes higher-speed decoding possible.

FIG. 10B is a diagram for illustrating an exemplary sequence and an exemplary decoding order of parameters included in SAO information which are used for performing the operation shown in FIG. 3. It is to be noted that (a) and (b) in FIG. 10B correspond to (a) and (b) in FIG. 10A, respectively. Moreover, context adaptive binary arithmetic decoding is sequentially performed on the SAO_OFFSET, and bypass arithmetic decoding can be performed on the SAO_BAND_POSITION and the SAO_OFFSET_SIGN in parallel. However, because parts on which bypass arithmetic decoding is performed precede and follow a part on which context adaptive binary arithmetic decoding is performed, a portion on which parallel processing can be performed is disrupted. Thus, the sequence of the parameters shown in FIG. 10A in this embodiment is more suitable for high-speed processing than the sequence of the parameters shown in FIG. 10B. However, the sequence of the parameters shown in FIG. 10B allows the moving picture decoding apparatus to recognize in advance a band offset position (SAO pixel value band position information), and thus there is an advantage of determining in advance a storage position inside a memory at which a SAO offset value is stored according to the SAO pixel value band position information. In contrast, in this embodiment, the storage position is determined regardless of the band offset position (SAO pixel value band position information), and the SAO pixel value band position information indicating the band offset position is transmitted to the loop filter 130 when SAO is applied. With this, it is possible to successfully decode the parameters according to the order of the parameters shown in FIG. 10A.

It is to be noted that in the example shown in FIG. 10A, in the case where an i (where i is an integer greater than or equal to 2) number of SAO_OFFSET is present even when context binary arithmetic coding is performed on the whole or part of SAO_OFFSET, the i number of SAO_OFFSET is decoded in the order of being included in the bit stream BS. However, the present disclosure is not limited to this, a PREFIX part collectively including only the parts of each SAO_OFFSET and a SUFFIX part collectively including only the remaining parts of each SAO_OFFSET may be decoded in order.

FIG. 10C is a diagram showing an exemplary sequence of parameters included in SAO information and an exemplary decoding order of the parameters when the i number of SAO_OFFSET each includes a PREFIX part and a SUFFIX part.

For instance, context adaptive binary arithmetic coding is performed on only the first N number of bits of SAO_OFFSET, and bypass arithmetic coding is performed on the remaining bits. In addition, as stated, the i (i=4 in a Non Patent Literature) number of SAO_OFFSET is present. In such a case, the bit stream BS includes: a PREFIX part (SAO_OFFSET_PREFIX) which collectively includes parts (the N number of the bits) on which context adaptive binary arithmetic coding is performed and is shown by (a) in FIG. 10C; and a SUFFIX part (SAO_OFFSET_SUFFIX) which collectively includes parts on which bypass arithmetic coding is performed and is shown by (a) in FIG. 10C, the PREFIX part and the SUFFIX part being included in each of the i number of SAO_OFFSET. In addition, the SUFFIX part follows the PREFIX part. In this embodiment, when such a bit stream BS is decoded, as shown by (b) in FIG. 10C, bypass arithmetic decoding is continuously performed not only on SAO_OFFSET_SIGN and SAO_BAND_POSITION but also on SAO_OFFSET_SUFFIX, the SUFFIX part. With this, it is possible to increase a parallel processing capability to achieve high-speed decoding.

As described, the moving picture decoding apparatus and the moving picture decoding method according to Embodiment 1 make it possible to efficiently decode, at high speed, the SAO information included in the bit stream.

Specifically, as described in Embodiment 1, it is possible to obtain a greater part on which parallel operation can be performed, by performing context adaptive binary arithmetic decoding on, among the multiple types of the information included in the SAO information, predetermined types of information, and continuously performing bypass arithmetic decoding on other multiple types of information, thereby performing efficient parallel processing, that is, high-speed decoding.

Moreover, it is possible to remove a determination process (e.g., step SB02 in FIG. 3) by decoding relevant information (sao_band_position) of band offset after sao_offset, thereby decoding an efficiently coded bit stream.

It is to be noted that although decoding applied to each of the parameters is switched between context adaptive binary arithmetic decoding and bypass arithmetic decoding for each parameter in the above description, the present disclosure is not limited to this. For example, as shown in FIG. 10C, an advantageous effect of reducing a certain amount of processing is expected by only switching decoding applied to each of parts included in a parameter between context adaptive binary arithmetic decoding and bypass arithmetic decoding for each part. In this case, not only the advantageous effect of this embodiment but also reduction of an internal memory can be achieved.

It is to be noted that as an exemplary way of selecting a binary string, a Huffman code may be derived from a mode number obtained based on an occurrence frequency, a table may be generated from the code, and a part in which an occurrence probability is biased may be selected as a prefix part. Determining the binary string in this manner makes it possible to increase a parallel processing capability, and perform higher-speed decoding.

As another way of selecting a binary string, a binary string may have a fixed length. Here, SAO information is used for a loop filter process, which affects the image quality of an output image. A part on which bypass arithmetic decoding is performed has directly something to do with an amount of encoding in particular, and thus using the fixed length when a moving picture coding apparatus performs selection regardless of the amount of encoding allows the moving picture coding apparatus to select the SAO information according to the characteristics of video. As a result, it is possible to provide a decoded image having high image quality.

It is to be noted that although this embodiment has described the case where context adaptive binary arithmetic coding is performed on the at least part of the SAO offset value (sao_offset), the parameter, the present disclosure is not limited to this. Even when bypass arithmetic coding is performed on the whole of the parameter, by performing bypass arithmetic decoding in parallel using the order described in this embodiment which is different from the conventional method, it is possible to perform high-speed decoding. Moreover, it is possible to produce an advantageous effect of removing a process of determining whether or not band offset is indicated, and to aim for reduction in a burden of processing.

Embodiment 2

A moving picture coding apparatus in this embodiment codes a moving picture to generate a bit stream BS decoded by the moving picture decoding apparatus 100 according to Embodiment 1.

Figure 11:
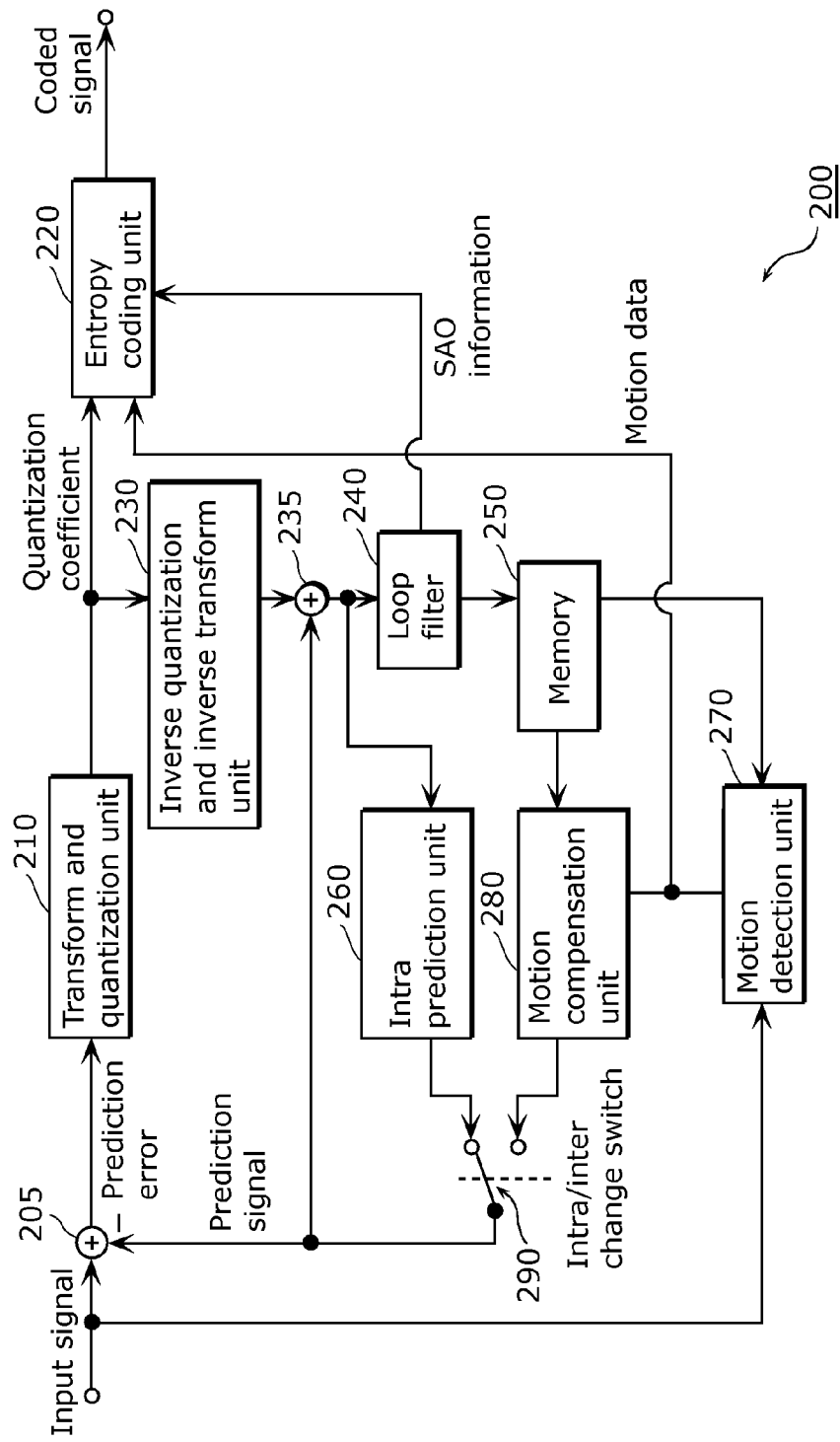
FIG. 11 is a block diagram showing an exemplary configuration of a moving picture decoding apparatus according to Embodiment 2.

FIG. 11 is a block diagram showing an exemplary configuration of a moving picture coding apparatus 200 according to Embodiment 2.

As shown in FIG. 11, the moving picture coding apparatus 200 includes a subtractor 205, a transform and quantization unit 210, an entropy coding unit 220, an inverse quantization and inverse transform unit 230, an adder 235, a loop filter 240, a memory 250, an intra prediction unit 260, a motion detection unit 270, a motion compensation unit 280, and an intra/inter change switch 290.

The subtractor 205 calculates a difference between a prediction signal and an input signal representing an image, that is, a prediction error.

The transform and quantization unit 210 transforms a prediction error in a spatial domain to generate a transform coefficient in a frequency domain. For example, the transform and quantization unit 210 performs discrete cosine transform (DCT) on the prediction error, to generate a transform coefficient. Furthermore, the transform and quantization unit 210 quantizes the transform coefficient, to generate a quantization coefficient.

The entropy coding unit 220 performs variable length coding on the quantization coefficient, to generate a coded signal (bit stream). Moreover, the entropy coding unit 220 codes motion data (e.g., a motion vector) detected by the motion detection unit 270, and outputs the coded motion data included in the coded signal. Furthermore, the entropy coding unit 220 performs variable length coding on SAO information used by the loop filter 240, and include the SAO information on which variable length coding has been performed into the coded signal.

The inverse quantization and inverse transform unit 230 performs inverse quantization on the quantization coefficient, to reconstruct a transform coefficient. Moreover, the inverse quantization and inverse transform unit 230 performs inverse transform on the reconstructed transform coefficient, to reconstruct a prediction error. It is to be noted that because the reconstructed prediction error has lost information due to the quantization, the reconstructed prediction error does not match the prediction error generated by the subtractor 205. To put it another way, the reconstructed prediction error includes a quantization error.

The adder 235 adds the reconstructed prediction error to the prediction signal, to generate a local decoded image (provisionally decoded image).

The loop filter 240 performs a loop filter process on the generated local decoded image. It is to be noted that the loop filter process includes SAO. In other words, the loop filter 240 performs SAO on the local decoded image using SAO information, and outputs the SAO information to the entropy coding unit 220.

The memory 250 is a memory for storing reference images used for motion compensation. Specifically, the memory 250 stores local decoded images on which the loop filter process has been performed.

The intra prediction unit 260 performs intra prediction to generate a prediction signal (intra-prediction signal). Specifically, the intra prediction unit 260 performs intra prediction by referring to an image around a current block to be coded (input signal) in the local decoded image generated by the adder 235, to generate an intra-prediction signal.

The motion detection unit 270 detects motion data (e.g., a motion vector) between the input signal and a reference image stored in the memory 250.

The motion compensation unit 280 performs motion compensation based on the detected motion data, to generate a prediction signal (inter-prediction signal).

The intra/inter change switch 290 selects either the intra-prediction signal or the inter-prediction signal, and outputs the selected signal to the subtractor 205 and the adder 235 as the prediction signal.

The above configuration allows the moving picture coding apparatus 200 according to Embodiment 2 to compression-code image data.

Here in Embodiment 2, the entropy coding unit 220 includes a SAO information coding unit that codes SAO information.

The following describes an overview of an arithmetic coding method performed by the SAO information coding unit in this embodiment. Unlike the conventional arithmetic coding methods for SAO information, the arithmetic coding method performed by the SAO information coding unit in this embodiment includes: performing context adaptive binary arithmetic coding on a predetermined parameter included in SAO information; and continuously performing bypass arithmetic coding on parameters of other multiple types included in the SAO information. With this, it is possible to achieve efficient parallelization of processing, and code the SAO information at high speed.

The overview of the arithmetic coding method in this embodiment has been described above. The same method as the conventional arithmetic coding methods may be used, unless otherwise explained.

Next, the flow of the arithmetic coding method for SAO information in this embodiment is described.

Figure 12:
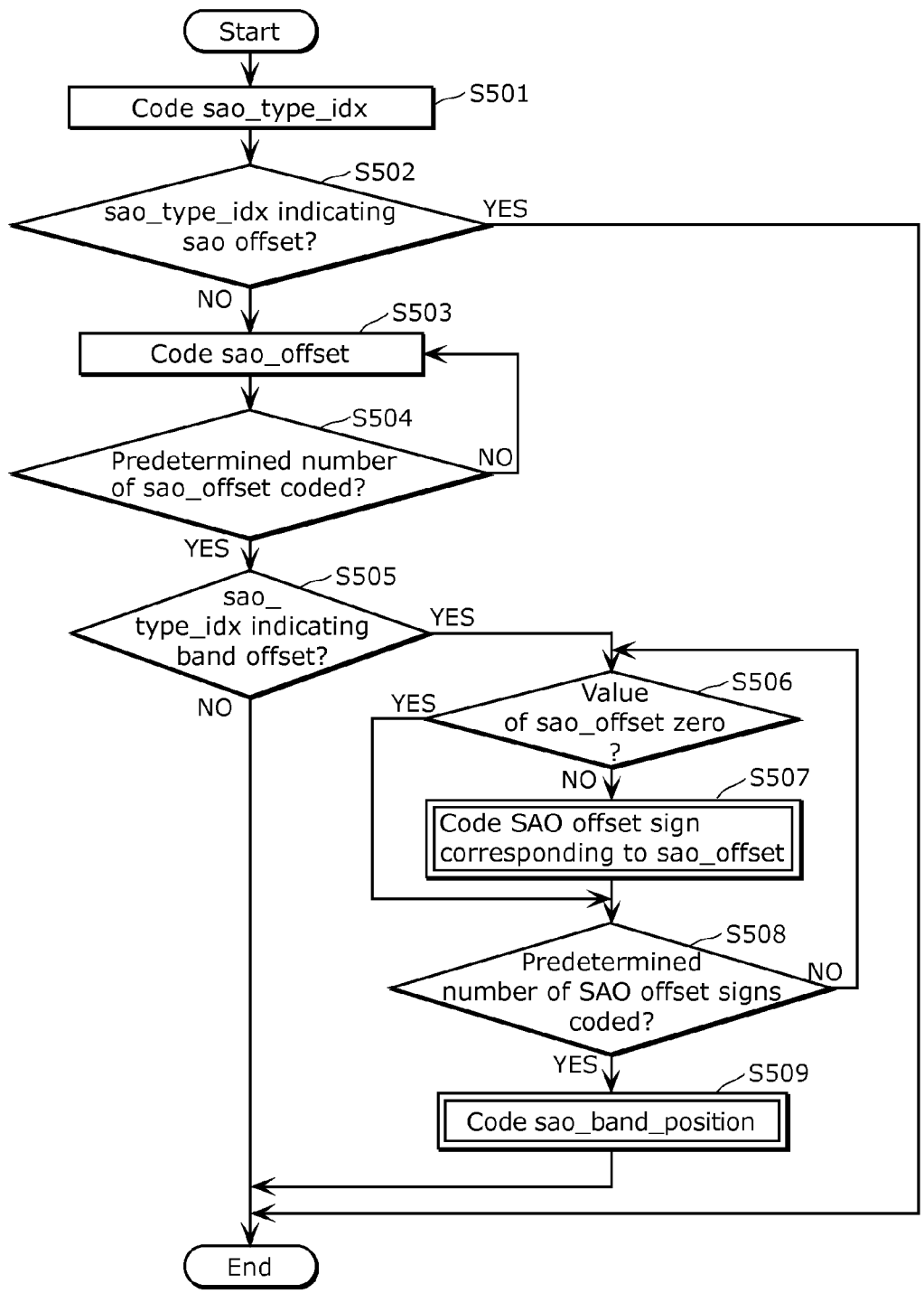
FIG. 12 is a flow chart showing arithmetic coding by a SAO information coding unit according to Embodiment 2.

FIG. 12 is a flow chart showing arithmetic coding by the SAO information coding unit according to Embodiment 2. First, the SAO information coding unit codes sao_type_idx (S501). It is to be noted that the sao_type_idx does not need to be the information per se shown in FIG. 1A. For instance, as long as the sao_type_idx is information for identifying SAO type information such as a flag indicating that the same SAO type information as the SAO type information of a left target region is to be used, the sao_type_idx is not limited to the information shown in FIG. 1A. This embodiment is characterized by a coding order of subsequent bit streams.

Next, when the sao_type_idx indicates that SAO is not to be performed (Sao off) (YES in S502), because it is no longer necessary to code SAO information, the SAO information coding unit terminates coding of SAO information. In contrast, when the sao_type_idx does not indicate Sao off (NO in S502), the SAO information coding unit codes a SAO offset value (sao_offset) (S503). Here, context adaptive binary arithmetic coding is performed on at least part of the sao_offset, and the at least part of the sao_offset is included in a bit stream by a predetermined method (S503). It is to be noted that the SAO information coding unit repeatedly performs the coding in step S503 until a predetermined number of sao_offset is coded (during a period of NO in S504). When all of sao_offset are coded (YES in S504), the SAO information coding unit determines whether or not the sao_type_idx indicates band offset (S505). When determining that the sao_type_idx does not indicate band offset (NO in S505), the SAO information coding unit terminates the coding of the SAO information. In contrast, when determining that the sao_type_idx indicates band offset (YES in S505), the SAO information coding unit determines whether or not the value of the already coded sao_offset is zero (S506).

Here, when determining that the value of the sao_offset is not zero (NO in S506), the SAO information coding unit codes a SAO offset sign corresponding to the sao_offset (S507). Bypass arithmetic coding is performed on the SAO offset sign. It is to be noted that the details of bypass arithmetic coding are the same as those of CABAC described in NPLs 1 to 3, and bypass arithmetic coding is processing comparable to bypass arithmetic decoding. In contrast, when determining that the value of the sao_offset is zero (YES in S506), the SAO information coding unit skips coding. The SAO information coding unit repeats steps S506 and S507 for all values of sao_offset (S508), and codes SAO pixel value band position information (sao_band_position) (S509) when the processes for all the values of the sao_offset are terminated (YES in S508). This parameter is a parameter on which bypass arithmetic coding is performed as above. Then, the coding of the SAO information is terminated.

It is to be noted that parameters that are information coded in the steps enclosed by double frame lines in FIG. 12 are parameters on which bypass arithmetic coding is performed. In addition, because a probability value is fixed in bypass arithmetic coding applied to these parameters, it is possible to code the parameters in parallel.

It is to be noted that conventional bypass arithmetic coding can be used for bypass arithmetic coding. In addition, bypass arithmetic coding may be arithmetic coding that does not require update of a probability value, and be different from arithmetic coding described in NPL 1 or 2.

It is to be noted that even the arithmetic coding method for SAO information in this embodiment makes it possible to achieve the efficient parallelization of processing as shown in FIG. 10A and FIG. 10C described in Embodiment 1, and thus it is possible to perform high-speed coding.

Here, a syntax for generating a bit stream in this embodiment is described by comparison with a conventional example.

FIG. 13A is a table showing a syntax for generating a conventional bit stream shown in NPL 3.

In this bit stream, part on which bypass arithmetic coding is performed is divided by part on which context adaptive binary arithmetic coding is performed. Further, a determination step of determining whether or not sao_type_idx indicates band offset coexists in processing of generating the bit stream. For this reason, it is difficult to perform the high-speed coding.

FIG. 13B is a table showing a syntax for generating a bit stream in this embodiment.

In this bit stream, parameters of multiple types on which bypass arithmetic coding is performed concentrate at the latter part. Further, because the above determination step is arranged, it is easy to perform the high-speed coding.

It is to be noted that in this embodiment, because the SAO pixel value band position information (sao_band_position) in the SAO information is coded last, when the SAO offset value (sao_offset) is decoded, it is necessary to consider a position at which the SAO offset value is stored, which increases a burden accordingly. However, an advantageous effect produced by this embodiment more than makes up for a demerit caused by the burden, and thus the moving picture coding method according to this embodiment is meaningful.

FIG. 14 is a table showing a syntax for generating another bit stream in this embodiment.

In this bit stream, a SAO offset value (sao_offset) is divided into a PREFIX part on which context adaptive binary arithmetic coding is performed and a SUFFIX part on which bypass arithmetic coding is performed. In this case, as shown in FIG. 10C, it is possible to perform higher-speed coding.

It is to be noted that although this embodiment has described the case where context adaptive binary arithmetic coding is performed on the at least part of the SAO offset value (sao_offset), the parameter, the present disclosure is not limited to this. Even when bypass arithmetic coding is performed on the whole of the parameter, by performing bypass arithmetic coding in parallel using the order described in this embodiment which is different from the conventional method, it is possible to perform the high-speed coding. Moreover, it is possible to produce an advantageous effect of removing a process of determining whether or not band offset is indicated, and to aim for reduction in a burden of processing.

Although the moving picture coding method and the moving picture decoding method according to aspects of the present disclosure have been described based on this embodiment, the present disclosure is not limited to this embodiment. Those skilled in the art will readily appreciate that various modifications may be made in this embodiment and that other embodiments may be obtained by arbitrarily combining the structural elements of the embodiments. Accordingly, all such modifications and other embodiments are included in the aspects of the present disclosure.

Figure 15A:
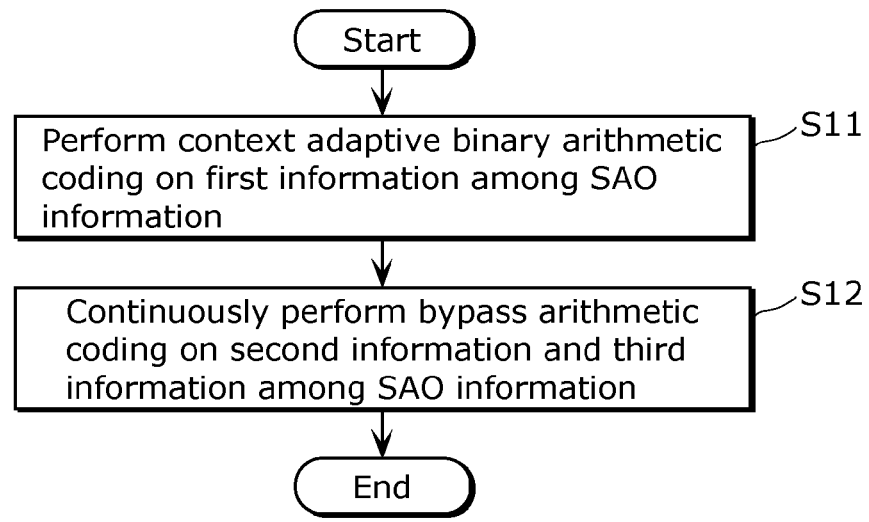
FIG. 15A is a flow chart for a moving picture coding method in an embodiment.

FIG. 15A is a flow chart for a moving picture coding method in another embodiment.

This moving picture coding method is a moving picture coding method in which an input image is coded to generate a bit stream, and includes step S11 and step S12. In step S11, context adaptive binary arithmetic coding in which a variable probability value is used is performed on first information among multiple types of SAO information (parameters) used for sample adaptive offset (SAO) that is a process of assigning an offset value to a pixel value of a pixel included in an image generated by coding an input image. In step S12, bypass arithmetic coding in which a fixed probability value is used is continuously performed on second information and third information among the multiple types of the SAO information. As a result, the coded second and third information are placed after the coded first information in a bit stream.

Figure 15B:
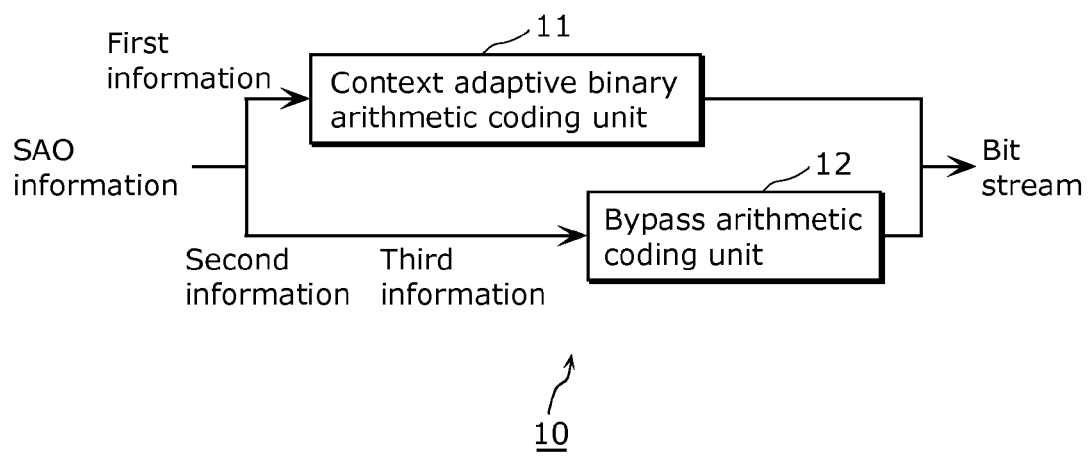
FIG. 15B is a block diagram showing a moving picture coding apparatus in an embodiment.

FIG. 15B is a block diagram showing a moving picture coding apparatus in the other embodiment.

A moving picture coding apparatus 10 is a moving picture coding apparatus that codes an input image to generate a bit stream, and includes a context adaptive binary arithmetic coding unit 11 and a bypass arithmetic coding unit 12. The context adaptive binary arithmetic coding unit 11 performs context adaptive binary arithmetic coding in which a variable probability value is used, on first information among multiple types of SAO information (parameters) used for sample adaptive offset (SAO) that is a process of assigning an offset value to a pixel value of a pixel included in an image generated by coding an input image. The bypass arithmetic coding unit 12 continuously performs bypass arithmetic coding in which a fixed probability value is used, on second information and third information among the multiple types of the SAO information. As a result, the coded second and third information are placed after the coded first information in the bit stream.

Figure 15C:
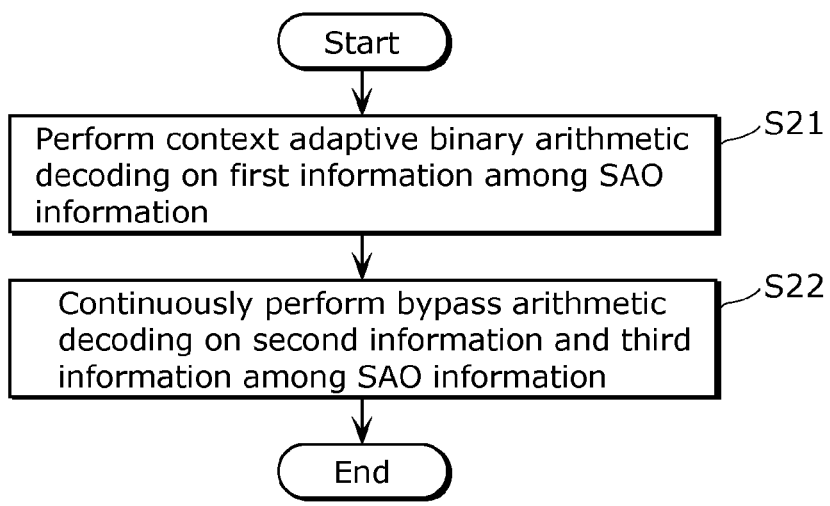
FIG. 15C is a flow chart for a moving picture decoding method in an embodiment.

FIG. 15C is a flow chart for a moving picture decoding method in the other embodiment.

This moving picture decoding method is a moving picture decoding method in which a coded image included in a bit stream is decoded, and includes step S21 and step S22. In step S21, context adaptive binary arithmetic decoding in which a variable probability value is used is performed on first information among multiple types of SAO information (parameters) that are included in a bit stream and used for sample adaptive offset (SAO) which is a process of assigning an offset value to a pixel value of a pixel included in an image generated by decoding an coded image. In step S22, bypass arithmetic decoding in which a fixed probability value is used is continuously performed on second information and third information that are among the multiple types of the SAO information and located after the first information in the bit stream.

Figure 15D:
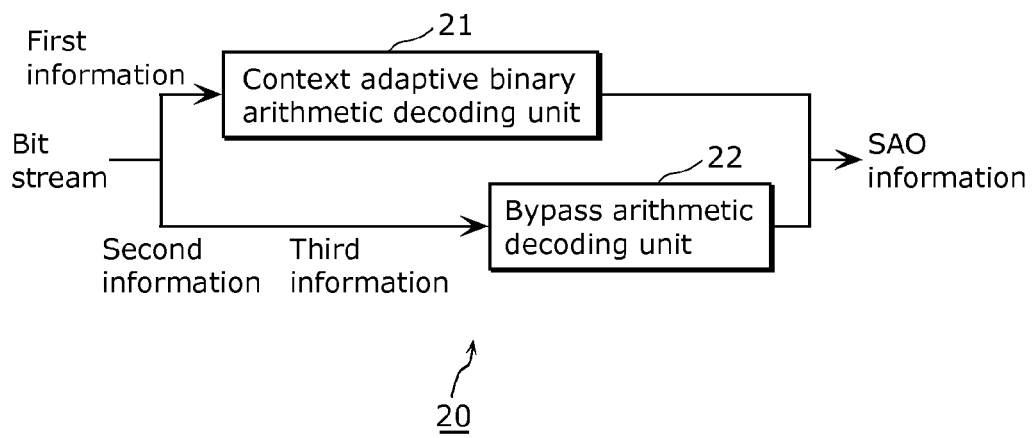
FIG. 15D is a block diagram showing a moving picture decoding apparatus in an embodiment.

FIG. 15D is a block diagram showing a moving picture decoding apparatus in the other embodiment.

A moving picture decoding apparatus 20 is a moving picture decoding apparatus that decodes a coded image included in a bit stream, and includes a context adaptive binary arithmetic decoding unit 21 and a bypass arithmetic decoding unit 22. The context adaptive binary arithmetic decoding unit 21 performs context adaptive binary arithmetic decoding in which a variable probability value is used, on first information among multiple types of SAO information (parameters) that are included in the bit stream and used for sample adaptive offset (SAO) which is a process of assigning an offset value to a pixel value of a pixel included in an image generated by decoding an coded image. The bypass arithmetic decoding unit 22 continuously performs bypass arithmetic decoding in which a fixed probability value is used, on second information and third information that are among the multiple types of the SAO information and located after the first information in the bit stream.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk and a semiconductor memory. Here, a software program for realizing the moving picture coding apparatus according to each of the embodiments is a program causing a computer to execute the steps shown in FIG. 15A. In addition, a software program for realizing the moving picture decoding apparatus according to each of the embodiments is a program causing a computer to execute the steps shown in FIG. 15C.

To put it another way, the moving picture coding apparatus and the moving picture decoding apparatus include a control circuit (control circuitry) and a storage device (storage) that is electrically connected to the control circuit (accessible from the control circuit). The control circuit includes at least one of an exclusive hardware product and a program executing unit. Furthermore, when the control circuit includes the program executing unit, the storage device stores a software program executed by the program executing unit.

Embodiment 3

An independent computer system can easily perform processing described in each of the embodiments by recording, in a recording medium, a program for implementing the structure of the moving picture coding method (image coding method) or the moving picture decoding method (image decoding method) according to each embodiment. The recording medium may be any as long as the program can be recorded thereon, such as a magnetic disk, an optical disk, an optical magnetic disk, an IC card, and a semiconductor memory.

Hereinafter, applications of the moving picture coding method (image coding method) and the moving picture decoding method (image decoding method) according to each of the embodiments, and a system using such applications will be described. The system features including an image coding apparatus using the image coding method, and an image coding and decoding apparatus including an image decoding apparatus using the image decoding method. The other configurations of the system can be appropriately changed depending on a case.

Figure 16:
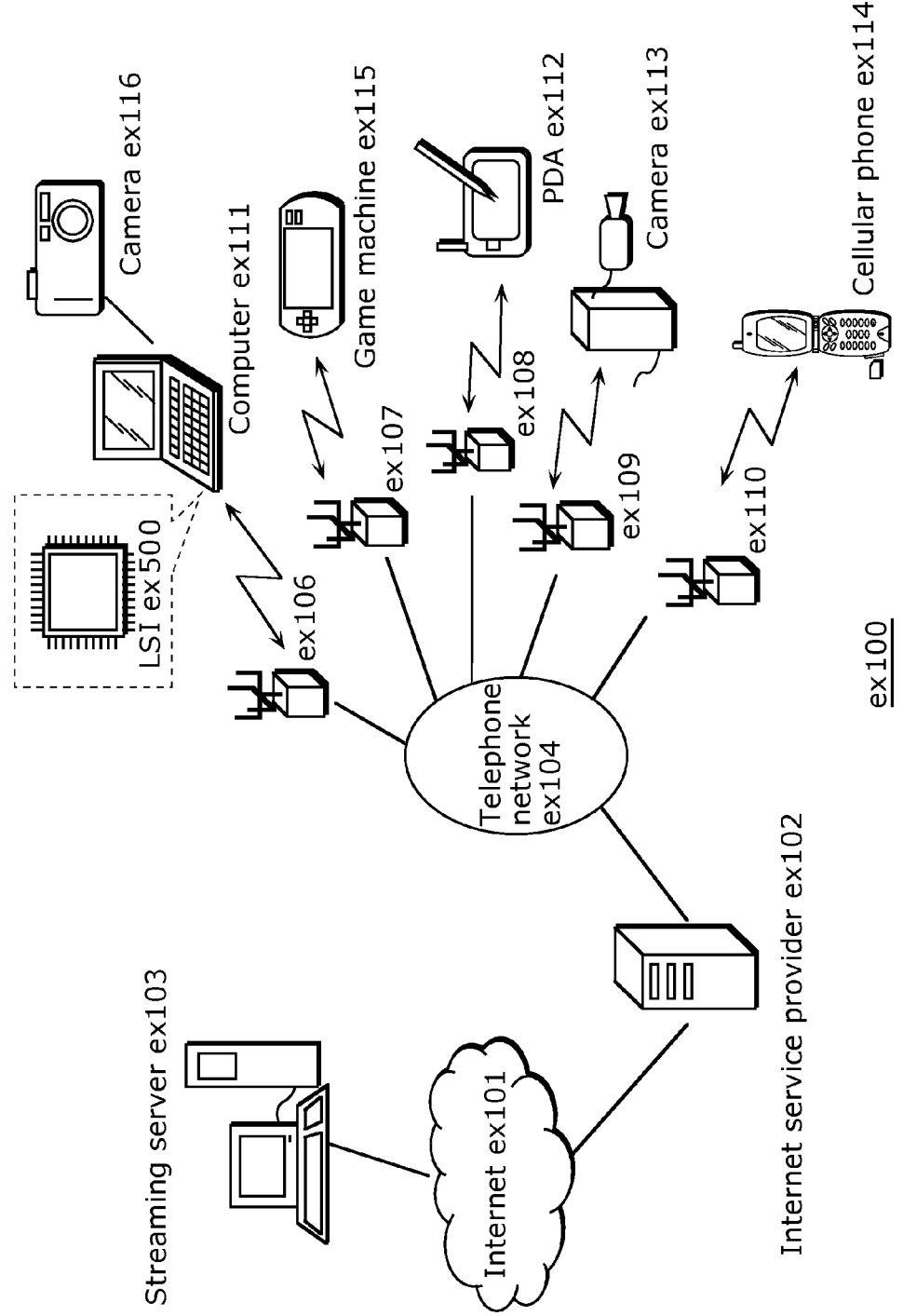
FIG. 16 is an overall configuration diagram of a content providing system that provides content distribution services.

FIG. 16 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via an Internet ex101, an Internet service provider ex102, a telephone network ex104, as well as the base stations ex106 to ex110.

However, the configuration of the content providing system ex100 is not limited to the configuration shown in FIG. 16, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. In such a distribution, a content (for example, video of a music live show) captured by the user using the camera ex113 is coded (that is, functions as the image coding apparatus according to an aspect of the present disclosure) as described above in each of the embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and the moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such encoding and decoding processes. The LSI ex500 may be configured of a single chip or a plurality of chips. Software for encoding and decoding moving pictures may be integrated into some type of a recording medium (such as a CD-ROM, a flexible disk, and a hard disk) that is readable by the computer ex111 and others, and the encoding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
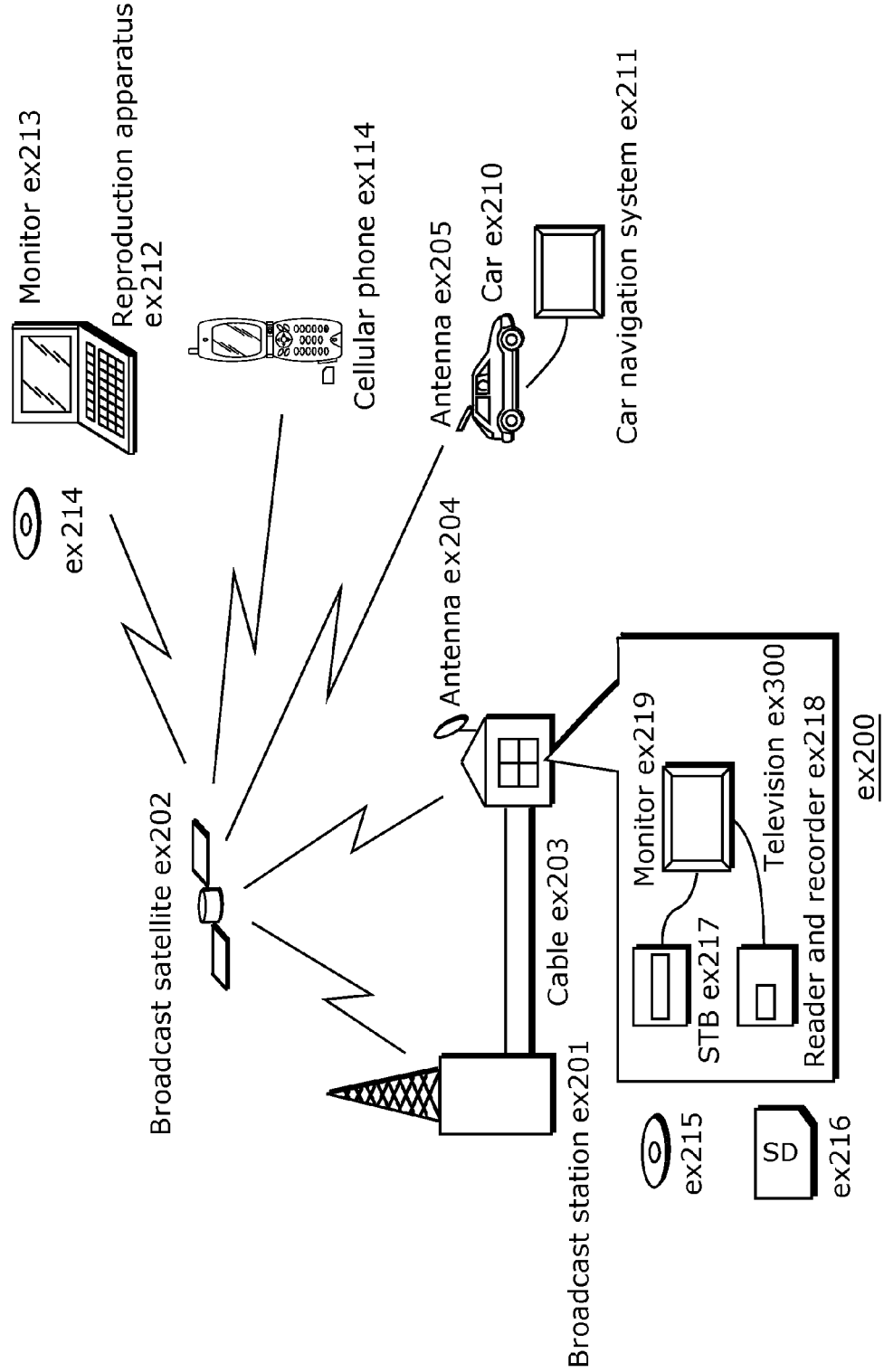
FIG. 17 is an overall configuration diagram of a digital broadcasting system.

Aside from the example of the content providing system ex100, at least one of the moving picture coding apparatus (the image coding apparatus) and the moving picture decoding apparatus (the image decoding apparatus) described in each of the embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing the audio data onto the video data. The video data is data coded by the moving picture coding method described in each of the embodiments (that is, data coded by the image coding apparatus according to an aspect of the present disclosure). Upon receipt of the video data, the broadcast satellite ex202 transmits radio waves for broadcasting. Then, a home-use antenna ex204 capable of receiving a satellite broadcast receives the radio waves. Next, a device such as a television (receiver) ex300 and a set top box (STB) ex217 decodes the received multiplexed data, and reproduces the decoded data (that is, functions as the image decoding apparatus according to an aspect of the present disclosure).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of the embodiments. In this case, the reproduced video signals are displayed on the monitor ex219, and another apparatus or system can reproduce the video signals, using the recording medium ex215 on which the multiplexed data is recorded. Furthermore, it is also possible to implement the moving picture decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 18:
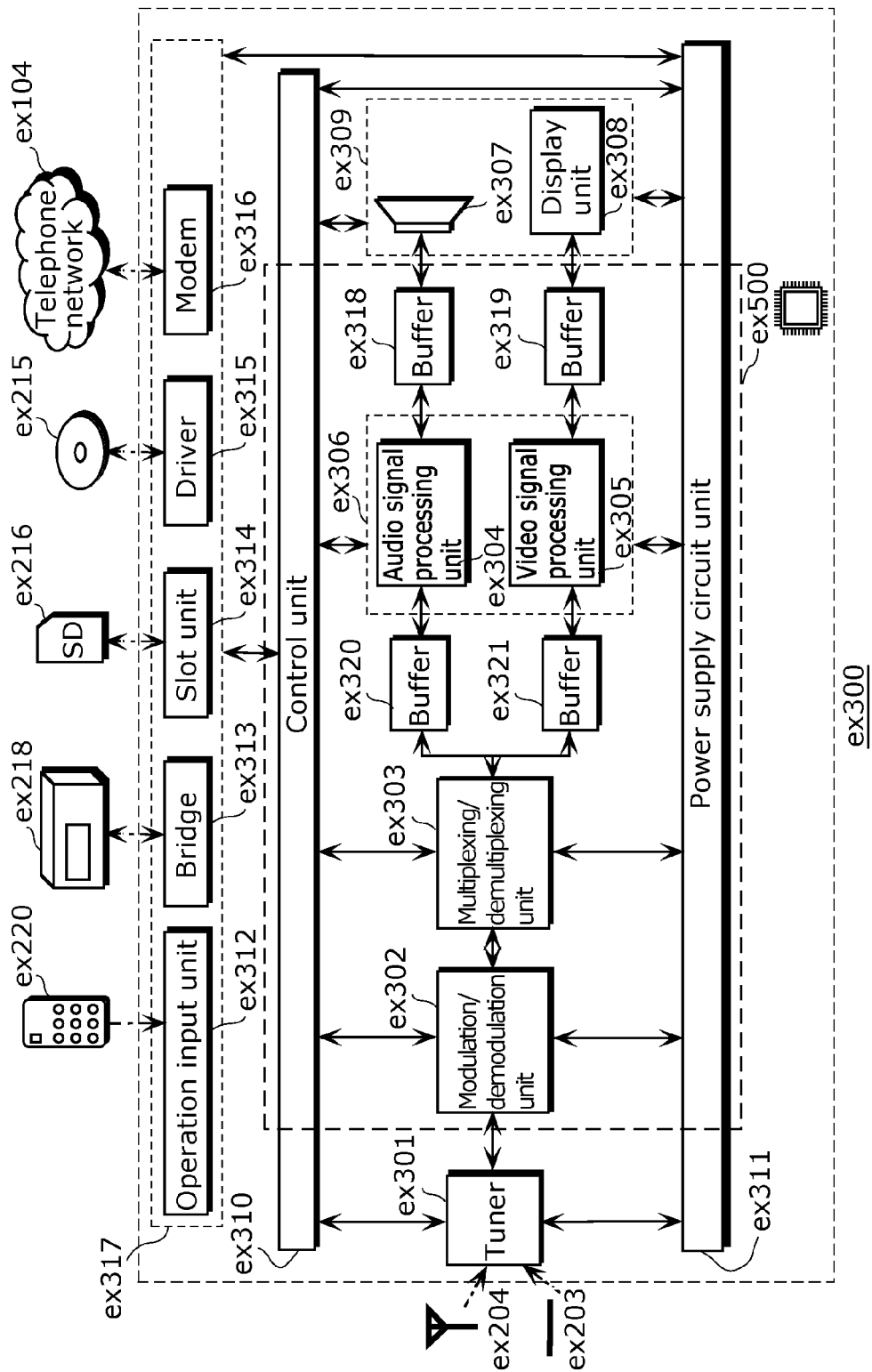
FIG. 18 is a block diagram showing an exemplary configuration of a television.

FIG. 18 illustrates the television (receiver) ex300 that uses the moving picture coding method and the moving picture decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data.

The television ex300 further includes: a signal processing unit ex306 including an audio signal processing unit ex304 and a video signal processing unit ex305 that decode audio data and video data and code audio data and video data, respectively (that function as the image coding apparatus and the image decoding apparatus, respectively, according to an aspect of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of the embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of the embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or encoding.

Figure 19:
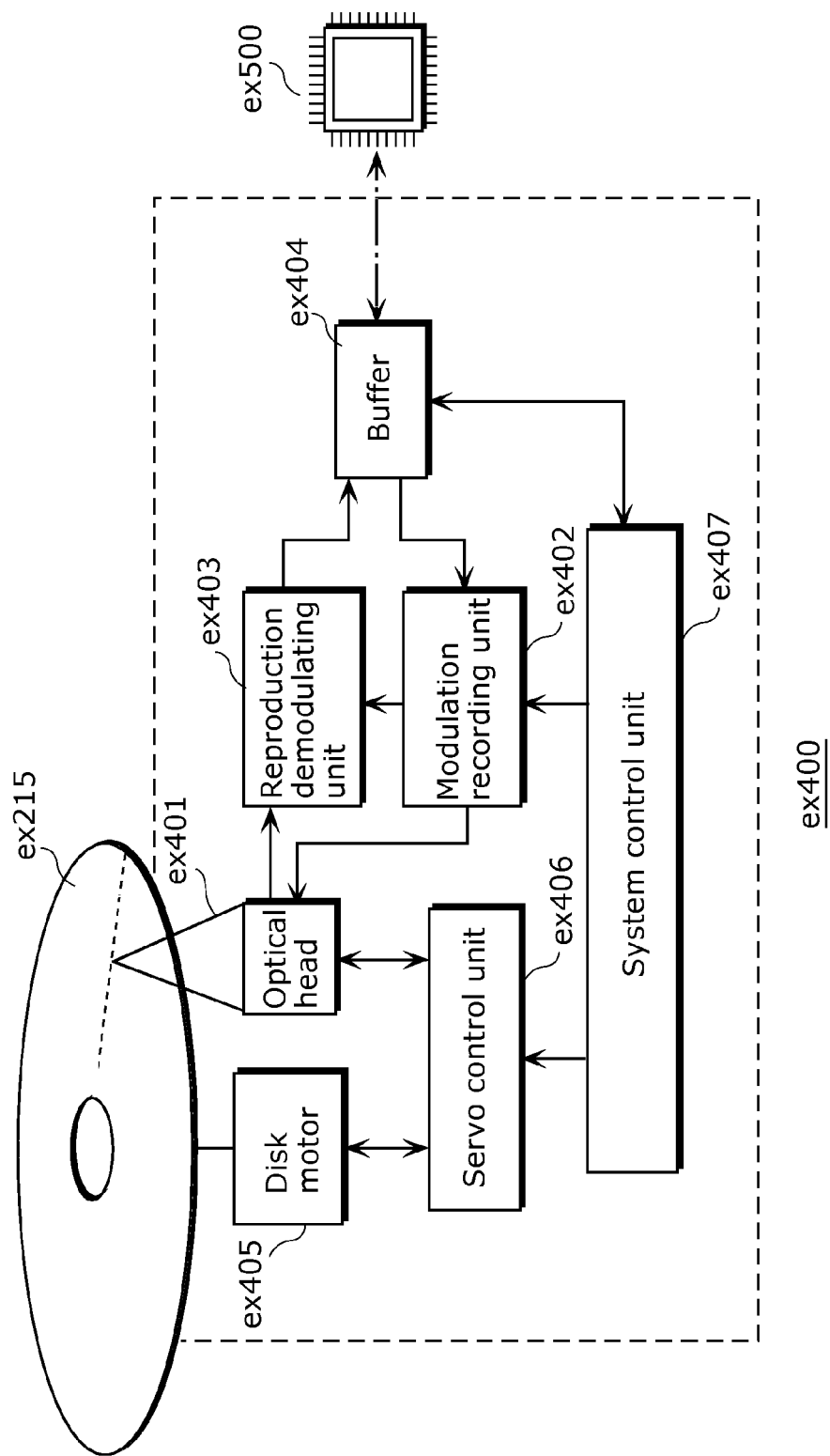
FIG. 19 is a block diagram showing an exemplary configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
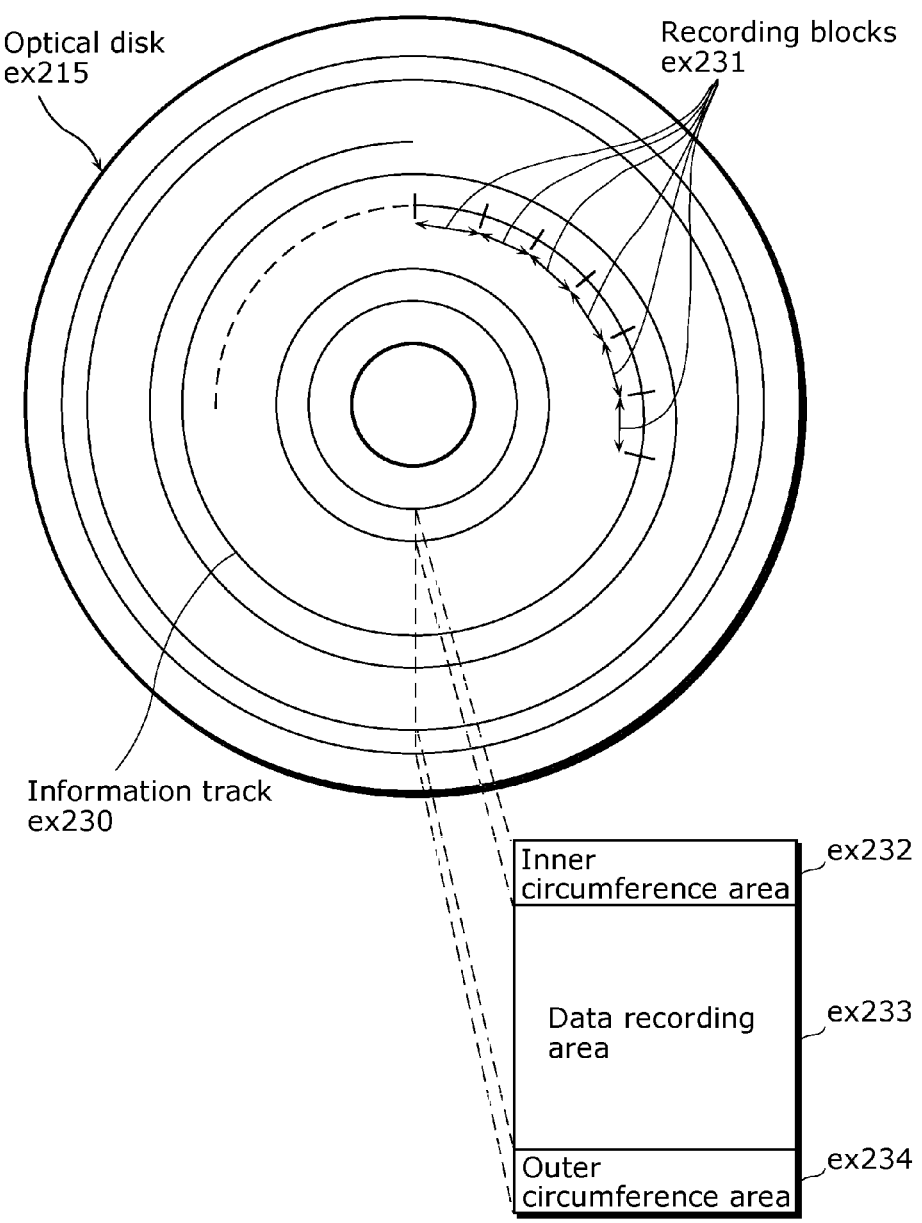
FIG. 20 is a diagram showing an exemplary configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
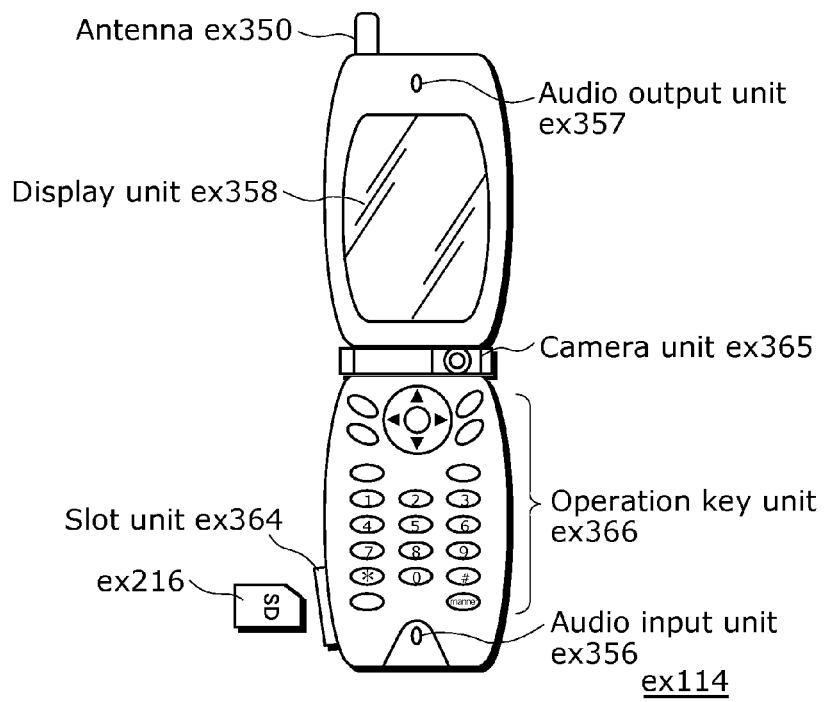
FIG. 21A is a diagram showing an exemplary cellular phone.

FIG. 21A illustrates the cellular phone ex114 that uses the moving picture coding method or the moving picture decoding method described in the embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Figure 21B:
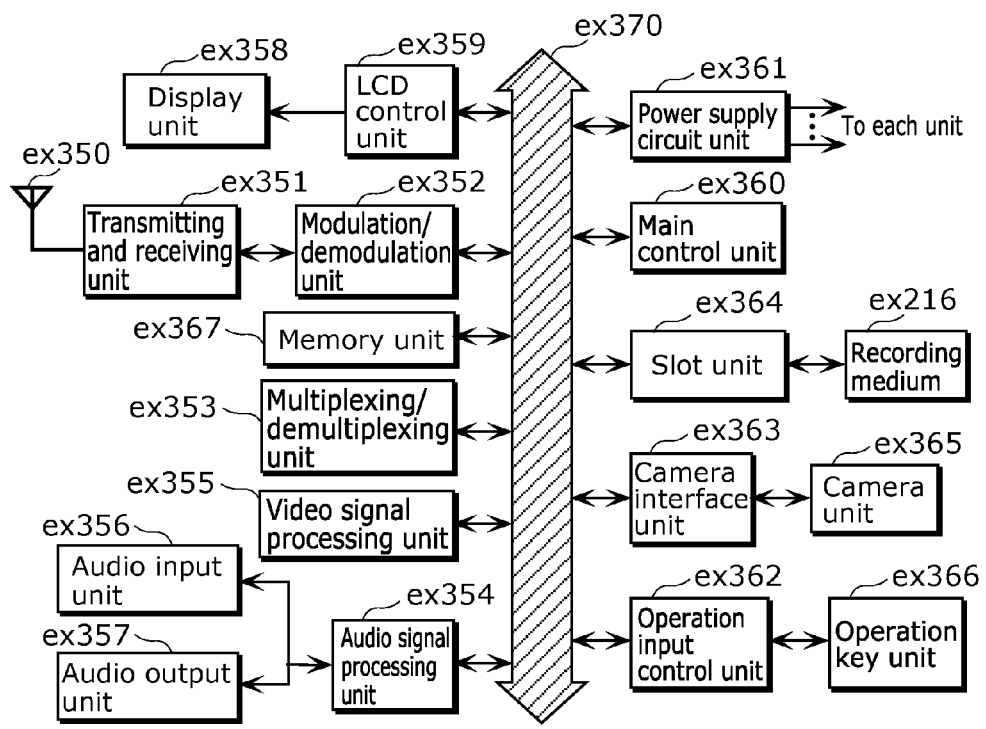
FIG. 21B is a block diagram showing an exemplary configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio are transmitted in data communication mode, the video signal processing unit ex355 compresses and codes video signals supplied from the camera unit ex365 using the moving picture coding method shown in each of the embodiments (that is, functions as the image coding apparatus according to an aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation circuit unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexer the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the coding method shown in each of the embodiments (that is, functions as the image decoding apparatus according to an aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have three types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method or the moving picture decoding method in each of the embodiments can be used in any of the devices and systems described above. Thus, the advantages described in each of the embodiment can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method or by the moving picture coding apparatus shown in each of Embodiments will be hereinafter described. The multiplexed data is a digital stream in the MPEG-2 Transport Stream format.

FIG. 22 is a diagram showing a structure of multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of the embodiments, or in a moving picture coding method or by a moving picture coding apparatus in conformity with a conventional standard, such as MPEG-2, MPEG4-AVC, and VC-1. The audio stream is, coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 23:
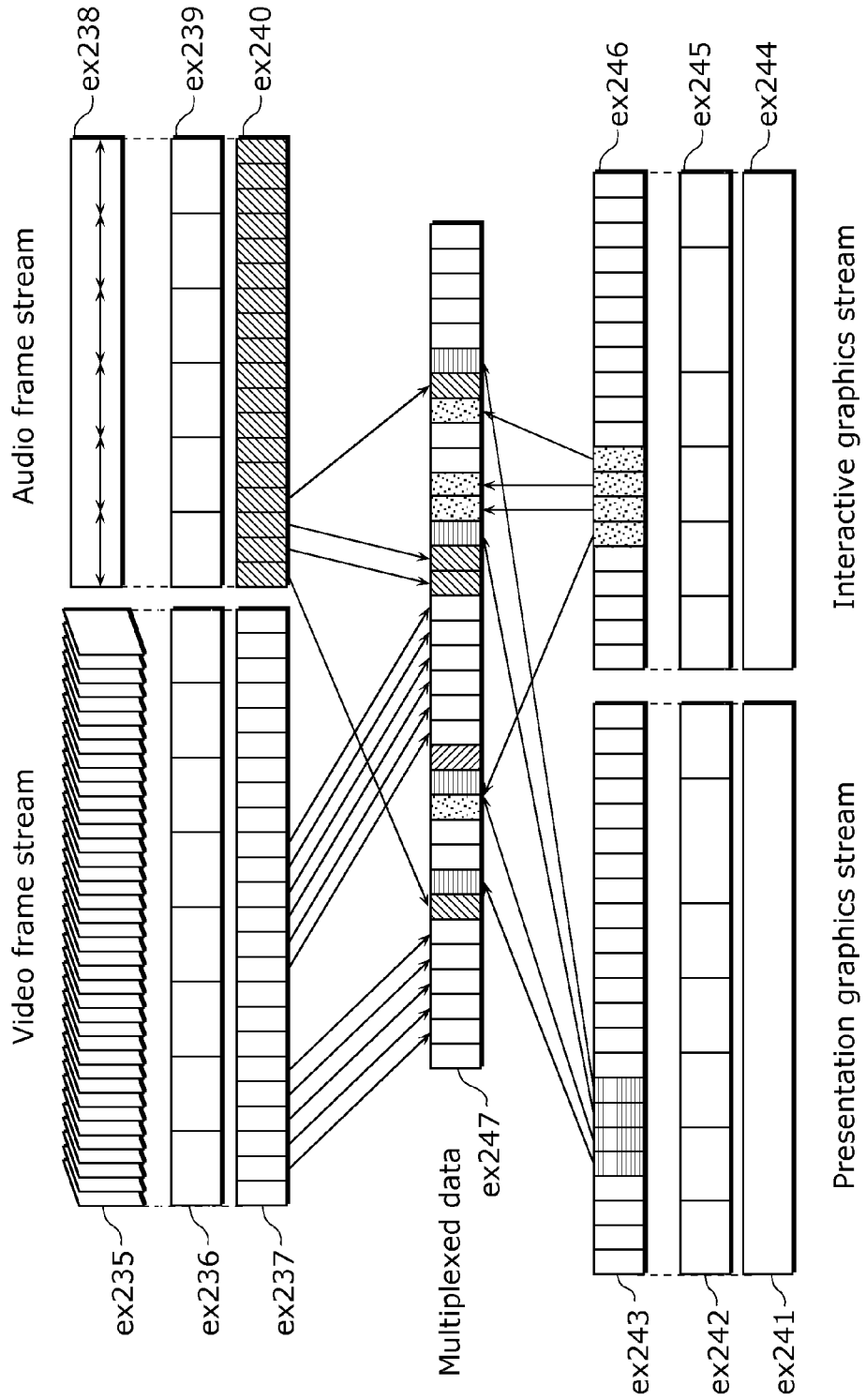
FIG. 23 is a diagram schematically showing how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
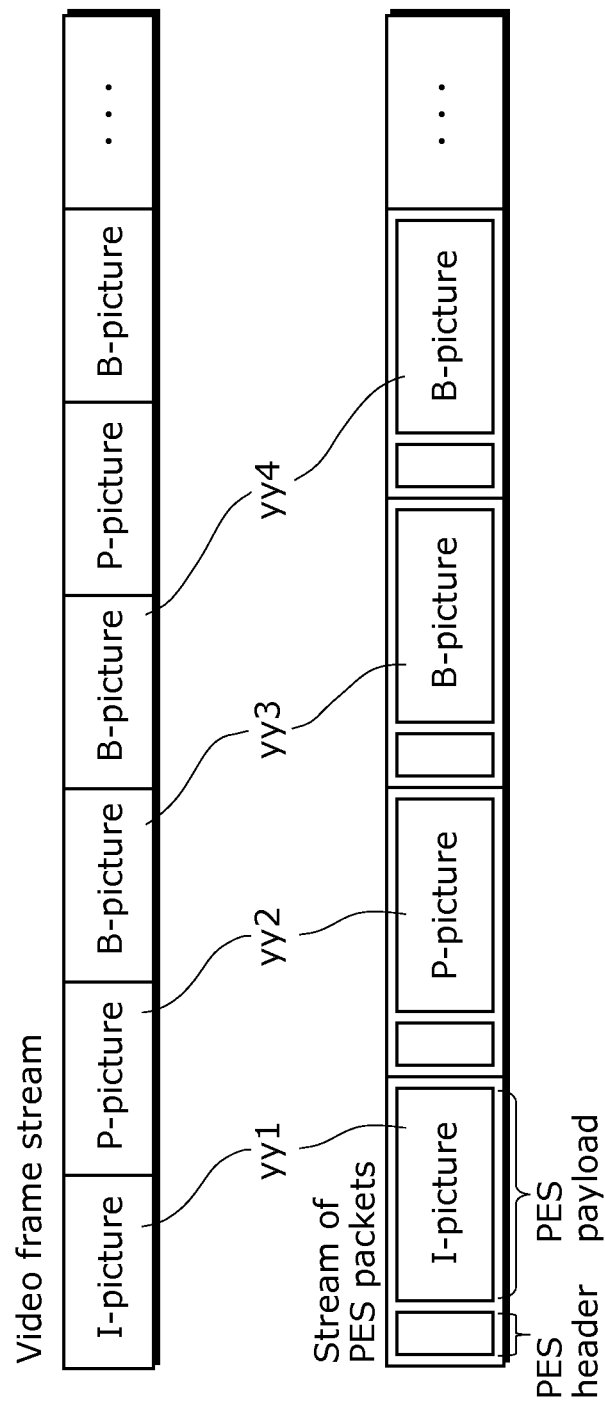
FIG. 24 is a diagram showing how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
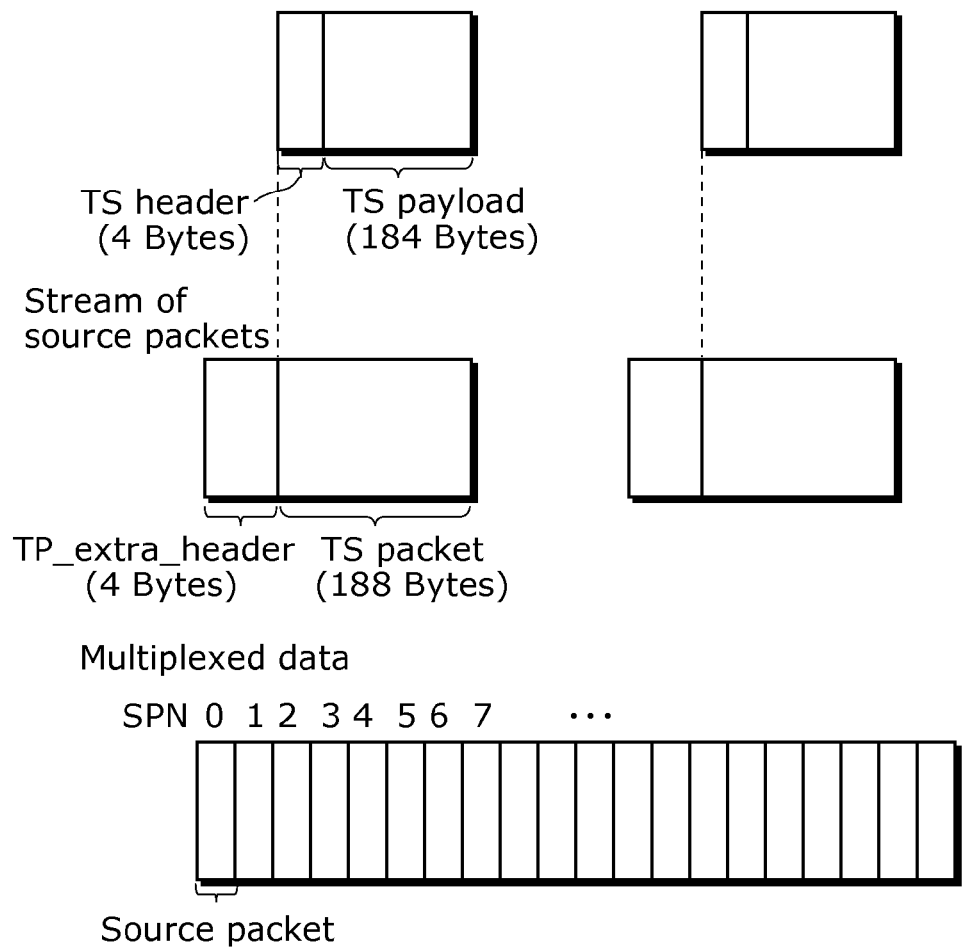
FIG. 25 is a diagram showing a structure of TS packets and source packets in multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
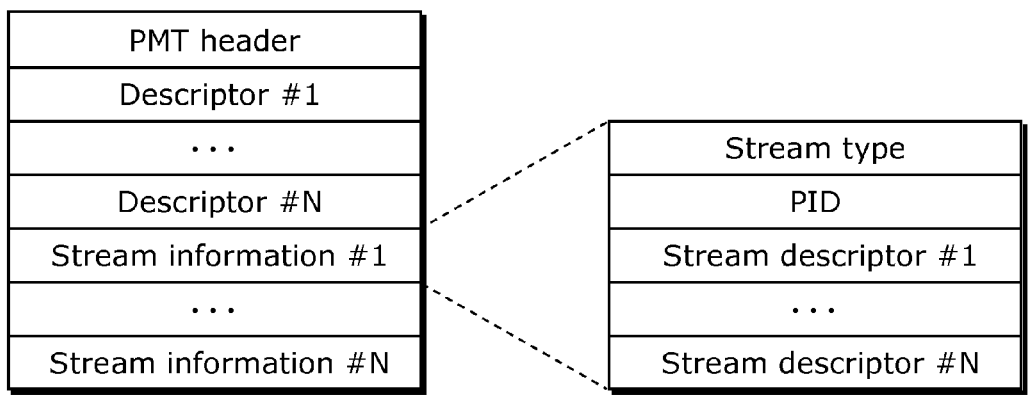
FIG. 26 is a diagram showing a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
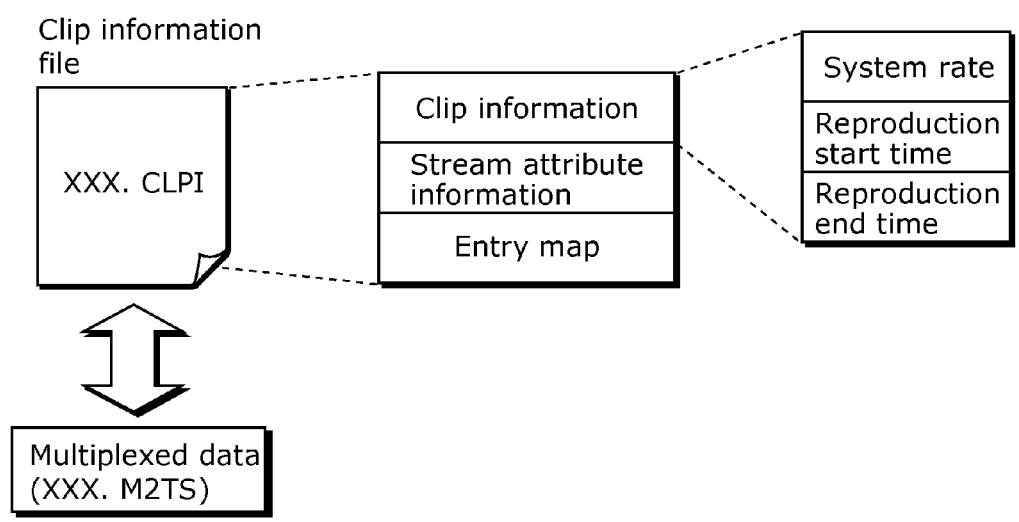
FIG. 27 is a diagram showing an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
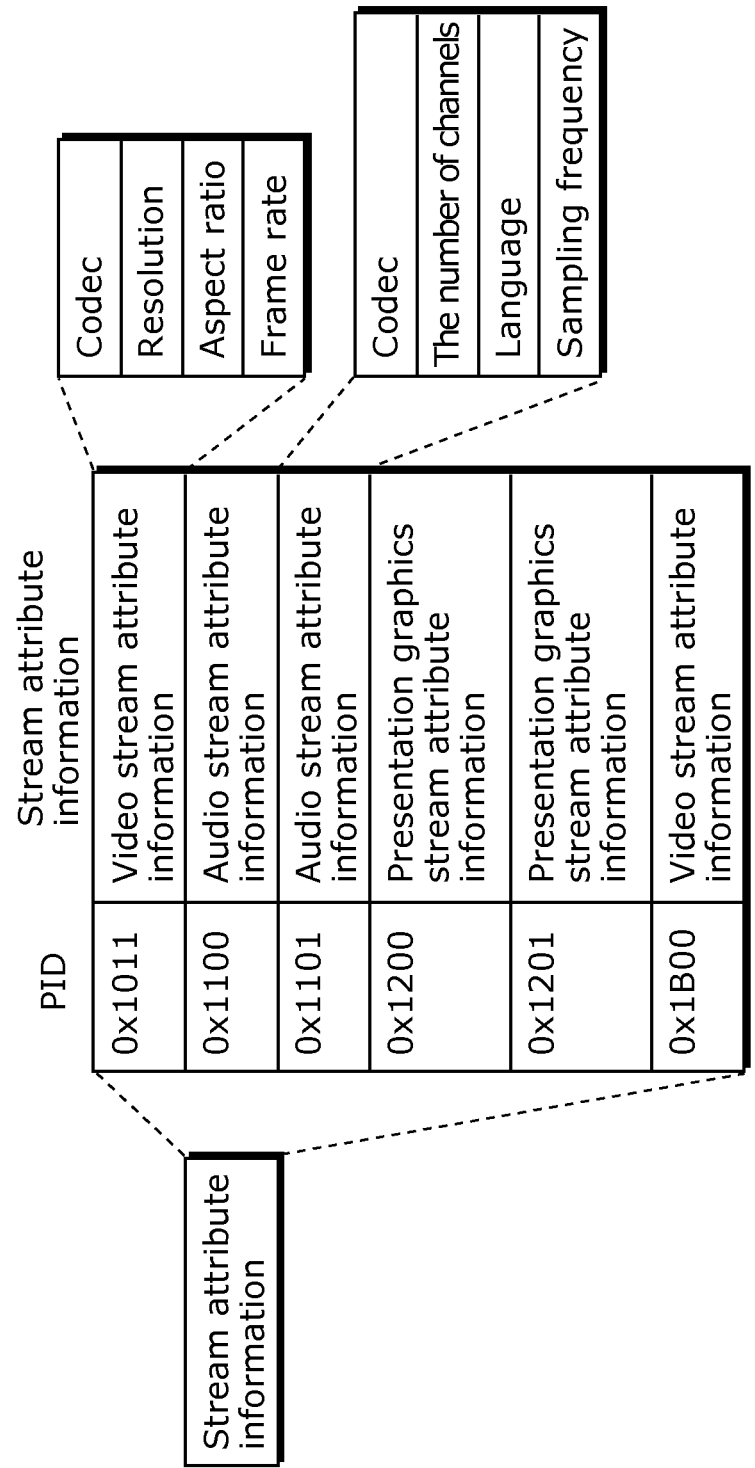
FIG. 28 is a diagram showing an internal configuration of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In this embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of the embodiments includes a step or a unit for allocating unique information indicating video data generated by the moving picture coding method or the moving picture coding apparatus in each of the embodiments, to the stream type included in the PMT or the video stream attribute information. With the structure, the video data generated by the moving picture coding method or the moving picture coding apparatus described in each of the embodiments can be distinguished from video data that conforms to another standard.

Figure 29:
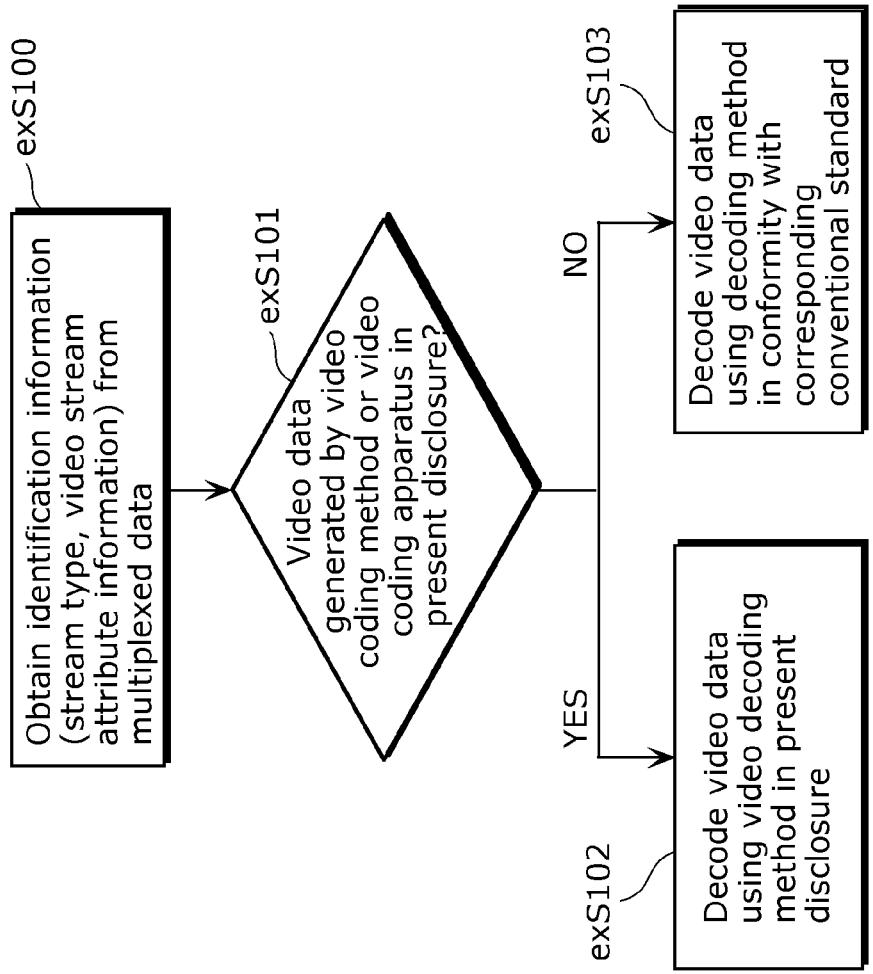
FIG. 29 is a flow chart showing steps for identifying video data.

Furthermore, FIG. 29 illustrates steps of the moving picture decoding method according to this embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of the embodiments. When it is determined that the stream type or the video stream attribute information indicates that the multiplexed data is generated by the moving picture coding method or the moving picture coding apparatus in each of the embodiments, in Step exS102, the stream type or the video stream attribute information is decoded by the moving picture decoding method in each of the embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of the embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in this embodiment can be used in the devices and systems described above.

Embodiment 5

Figure 30:
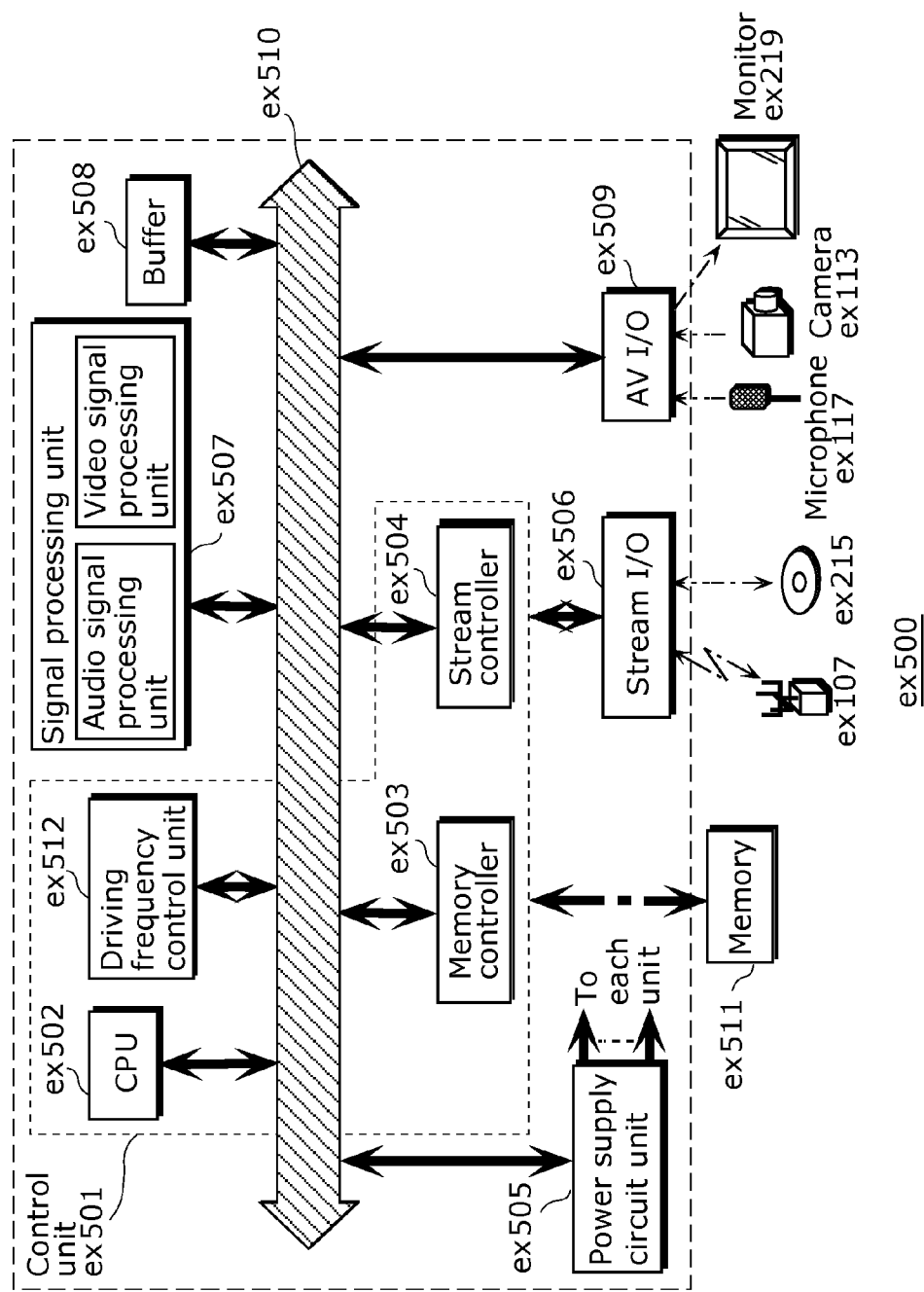
FIG. 30 is a block diagram showing an exemplary configuration of an integrated circuit that performs the moving picture coding method and the moving picture decoding method according to each of embodiments.

Each of the moving picture coding method, the moving picture coding apparatus, the moving picture decoding method, and the moving picture decoding apparatus in each of the embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of the embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method or the moving picture decoding method shown in each of the embodiments, by loading or reading, from a memory or the like, a program included in software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated by the moving picture coding method or by the moving picture coding apparatus described in each of the embodiments is decoded, compared to the case of decoding video data that conforms to a conventional standard, such as MPEG-2, MPEG4-AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
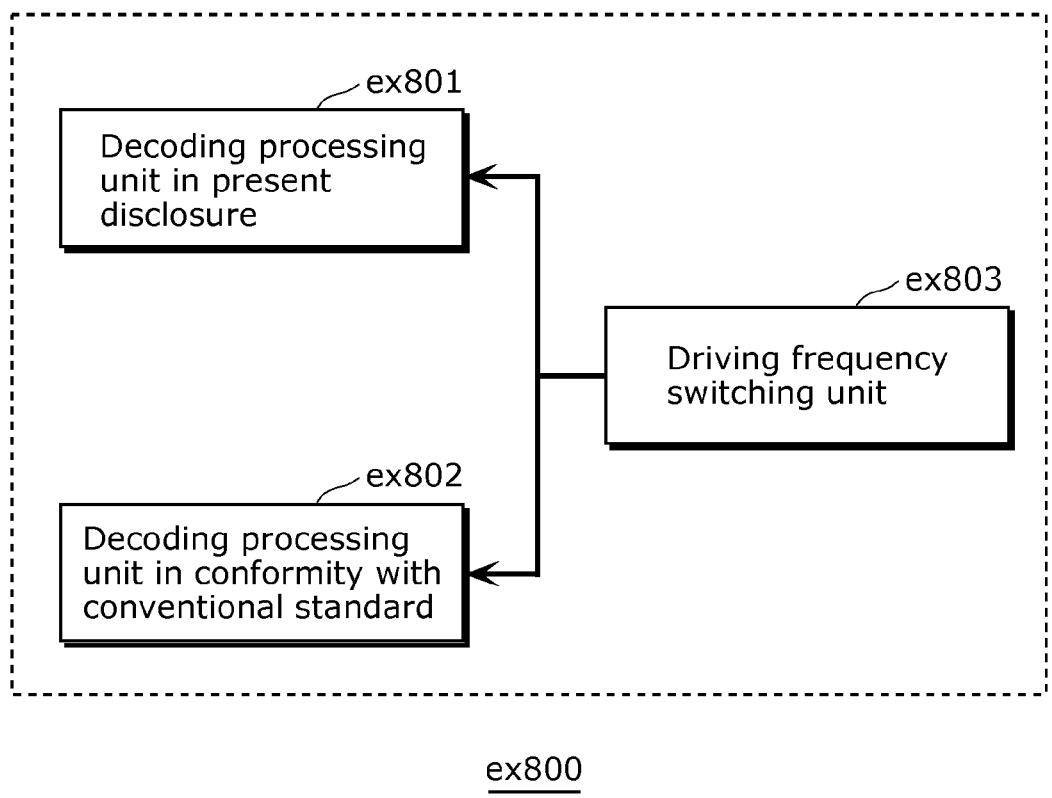
FIG. 31 is a diagram showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in this embodiment. A driving frequency switching unit ex803 sets a driving frequency to a higher driving frequency when video data is generated by the moving picture coding method or the moving picture coding apparatus described in each of the embodiments. Then, the driving frequency switching unit ex803 instructs a decoding processing unit ex801 that executes the moving picture decoding method described in each of the embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of the embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of the embodiments and the decoding processing unit ex802 that conforms to the conventional standard corresponds to the signal processing unit ex503 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex503 selects a driving frequency based on, for example, a look-up table in which the standards of the video data are associated with the driving frequencies as shown in FIG. 33. The driving frequency can be selected by storing the look-up table in the buffer ex508 and an internal memory of an LSI, and with reference to the look-up table by the CPU ex502.

Figure 32:
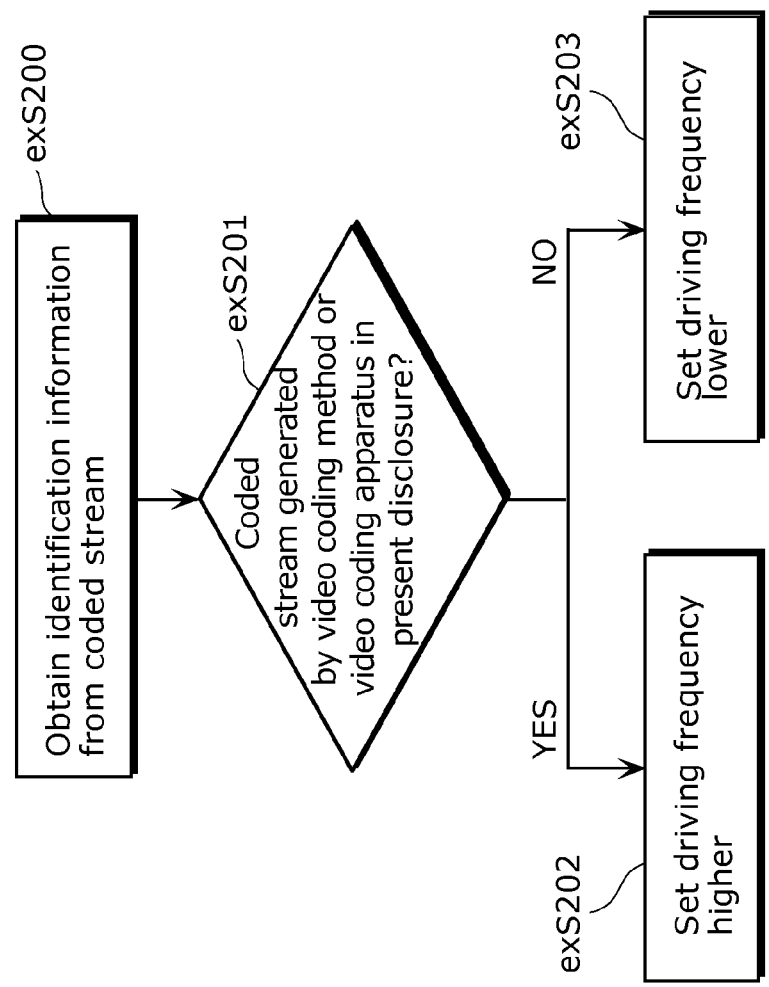
FIG. 32 is a flow chart showing steps for identifying video data and switching between driving frequency.

FIG. 32 illustrates steps for executing a method in this embodiment. First, in Step exS200, the signal processing unit ex507 obtains identification information from the multiplexed data. Next, in Step exS201, the CPU ex502 determines whether or not the video data is generated based on the identification information by the coding method and the coding apparatus described in each of the embodiments. When the video data is generated by the coding method or the coding apparatus described in each of the embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method or the coding apparatus described in each of the embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the moving picture coding method or the moving picture coding apparatus described in each of the embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method or the moving picture coding apparatus described in each of the embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the video coding apparatus described in each of the embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of the embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
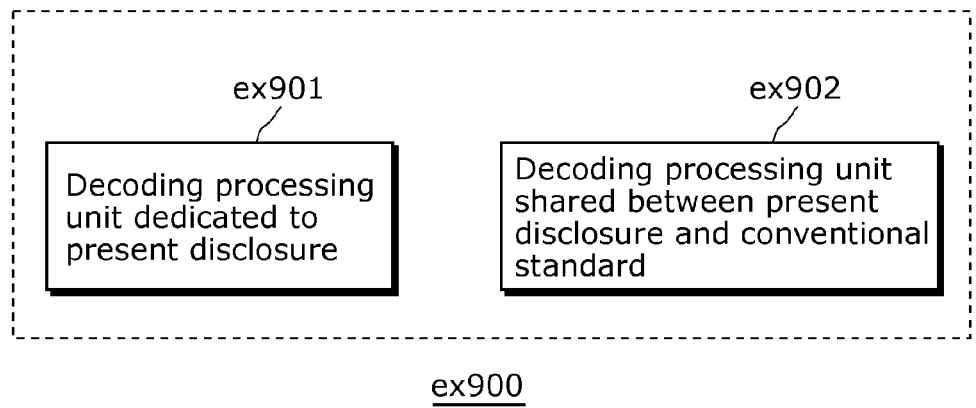
FIG. 34A is a diagram showing an exemplary configuration for sharing a module of a signal processing unit.

In order to solve the problems, what is conceived is a configuration in which the decoding processing unit for implementing the moving picture decoding method described in each of the embodiments and the decoding processing unit that conforms to the conventional standard, such as MPEG-2, MPEG4-AVC, and VC-1 are partly shared. ex900 in FIG. 34A shows an example of the configuration. For example, the moving picture decoding method described in each of the embodiments and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to an aspect of the present disclosure. The decoding processing unit for implementing the moving picture decoding method described in each of the embodiments may be shared for the processing to be shared, and a dedicated decoding processing unit may be used for processing unique to that of MPEG4-AVC.

Figure 34B:
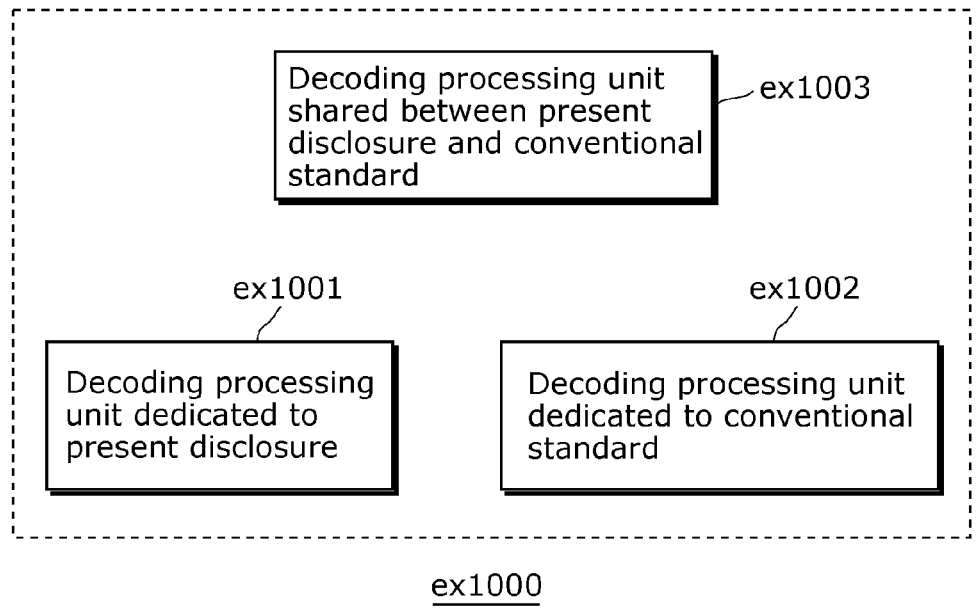
FIG. 34B is a diagram showing another exemplary configuration for sharing a module of a signal processing unit.

Furthermore, ex1000 in FIG. 34B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing of the aspect of the present disclosure and the processing of the conventional standard, respectively, and may be the ones capable of implementing general processing. Furthermore, the configuration of this embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The present disclosure is applicable to, for example, television receivers, digital video recorders, car navigation systems, cellular phones, digital cameras, digital video cameras, and so on.

The invention claimed is:

1. A moving picture coding method for coding an input image to generate a bit stream, the method comprising:
performing context adaptive binary arithmetic coding in which a variable probability value is used on, from among multiple types of sample adaptive offset (SAO) information used for SAO that is a process of assigning an offset value to a pixel value of a pixel included in an image generated by coding the input image, sao_offset indicating an absolute value of the offset value; and
continuously performing bypass arithmetic coding in which a fixed probability value is used on, from among the multiple types of the SAO information, (i) sao_band_position indicating a range of pixel values to which the SAO is applied and (ii) sao_offset_sign indicating whether the offset value is positive or negative, the sao_band_position being coded after the sao_offset_sign is coded,
wherein, in the bitstream, the sao_band_position and the sao_offset_sign, which are coded using the bypass arithmetic coding, are placed after the sao_offset, which is coded using the context adaptive binary arithmetic coding, and
wherein a variable probability is not used in the bypass arithmetic coding.

2. The moving picture coding method according to claim 1,
wherein a pixel to which the SAO is applied includes components of multiple types, and
the sao_offset, the sao_band_position, and the sao_offset_sign are coded for each of the components.

3. The moving picture coding method according to claim 1,
wherein in the continuously performing the bypass arithmetic coding, the bypass arithmetic coding is further performed on at least one other information among the multiple types of the SAO information immediately before or immediately after the coding of the sao_band_ position and the sao_offset_sign.

4. The moving picture coding method according to claim 1,
wherein the sao_offset is part of sao_type_idx indicating that the SAO is not to be performed or a type of the SAO.

5. The moving picture coding method according to claim 1,
wherein in the continuously performing the bypass arithmetic coding, the bypass arithmetic coding is performed on the sao_band_position after the bypass arithmetic coding is performed on the sao_offset_sign and without performing the context adaptive binary arithmetic coding on information after the bypass arithmetic coding is performed on the sao_offset_sign.

6. A moving picture decoding method for decoding a coded image included in a bit stream, the method comprising:
performing context adaptive binary arithmetic decoding in which a variable probability value is used on, from among multiple types of SAO information that are included in the bit stream and used for sample adaptive offset (SAO) which is a process of assigning an offset value to a pixel value of a pixel included in an image generated by decoding the coded image, sao_offset indicating an absolute value of the offset value; and
continuously performing bypass arithmetic decoding in which a fixed probability value is used on from among the multiple types of the SAO information, (i) sao_band_position indicating a range of pixel values to which the SAO is applied and (ii) sao_offset_sign indicating whether the offset value is positive or negative, the sao_band_position being decoded after the sao_offset_sign is decoded,
wherein, in the bitstream, the sao_band_position and the sao_offset_sign are located after the sao_offset, and wherein a variable probability is not used in the bypass arithmetic decoding.

7. The moving picture decoding method according to claim 6,
wherein in the continuously performing the bypass arithmetic decoding, the bypass arithmeticde coding is performed on the sao_band_position after the bypass arithmetic coding is performed on the sao_offset_sign and without performing the context adaptive binary arithmetic decoding on information after the bypass arithmetic decoding is performed on the sao_offset_sign.

8. The moving picture decoding method according to claim 6,
wherein a pixel to which the SAO is applied includes components of multiple types, and
the sao_offset, the sao_band_position, and the sao_offset_sign are decoded for each of the components.

9. The moving picture decoding method according to claim 6,
wherein in the continuously performing the bypass arithmetic decoding, the bypass arithmetic decoding is performed on at least one other information among the multiple types of the SAO information immediately before or immediately after the decoding of the sao_band_position and the sao_offset_sign.

10. The moving picture decoding method according to claim 6,
wherein the sao_offset is part of sao_type_idx indicating that the SAO is not to be performed or a type of the SAO.

11. A moving picture coding apparatus which comprises control circuitry and storage accessible from the control circuitry, and codes an input image to generate a bit stream,
wherein the control circuitry executes the moving picture coding method according to claim 1.

12. A moving picture coding and decoding apparatus which comprises control circuitry and storage accessible from the control circuitry,
wherein the control circuitry executes the moving picture coding method according to claim 1, and
the control circuitry further executes a moving picture decoding method for decoding a coded image included in a bit stream, the moving picture decoding method including:
performing context adaptive binary arithmetic decoding in which a variable probability value is used on, from among multiple types of sample adaptive offset (SAO) information that are included in the bit stream and used for SAO which is a process of assigning an offset value to a pixel value of a pixel included in an image generated by decoding the coded image, sao_offset indicating an absolute value of the offset value; and
continuously performing bypass arithmetic decoding in which a fixed probability value is used on, from among the multiple types of the SAO information, (i) sao_band_position indicating a range of pixel values to which the SAO is applied and (ii) sao_offset_sign indicating whether the offset value is positive or negative, the sao_band_position being decoded after the sao_offset_sign is decoded
wherein, in the bitstream, the sao_band_position and the sao_offset_sign are located after the sao_offset, and
wherein a variable probability is not used in the bypass arithmetic decoding.

13. A moving picture decoding apparatus which comprises control circuitry and storage accessible from the control circuitry, and decodes a coded image included in a bit stream,
wherein the control circuitry executes the moving picture decoding method according to claim 6.

* * * * *